United States Patent
Meyer et al.

(10) Patent No.: US 11,027,163 B2
(45) Date of Patent: *Jun. 8, 2021

(54) PREACTION SPRINKLER VALVE ASSEMBLIES, RELATED DRY SPRINKLER DEVICES AND FIRE PROTECTION SPRINKLER SYSTEMS

(71) Applicant: Victaulic Company, Easton, PA (US)

(72) Inventors: Stephen J. Meyer, Chester Springs, PA (US); Yoram Ringer, Providence, RI (US); Thomas Edwin Archibald, Saunderstown, RI (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,208

(22) Filed: Apr. 20, 2020

(65) Prior Publication Data
US 2020/0246650 A1  Aug. 6, 2020

Related U.S. Application Data

(63) Continuation of application No. 15/790,321, filed on Oct. 23, 2017, now Pat. No. 10,653,908, which is a
(Continued)

(51) Int. Cl.
*A62C 37/42* (2006.01)
*A62C 35/62* (2006.01)
(Continued)

(52) U.S. Cl.
CPC .............. *A62C 37/42* (2013.01); *A62C 3/004* (2013.01); *A62C 35/62* (2013.01); *A62C 37/11* (2013.01);
(Continued)

(58) Field of Classification Search
CPC .......... A62C 37/42; A62C 37/11; A62C 37/48; A62C 3/004; A62C 35/62; F16K 1/2007; F16K 31/002; F16K 31/465
See application file for complete search history.

(56) References Cited

U.S. PATENT DOCUMENTS

| | | | |
|---|---|---|---|
| 1,182,460 A | 5/1916 | Cruger |
| 2,251,422 A | 8/1941 | Rider |

(Continued)

FOREIGN PATENT DOCUMENTS

| | | | |
|---|---|---|---|
| CN | 101208136 A | 6/2008 |
| CN | 101252972 A | 8/2008 |

(Continued)

OTHER PUBLICATIONS

Int'l Search Report and Written Opinion dated Nov. 15, 2016 in Int'l Application No. PCT/US2016/044569.
(Continued)

*Primary Examiner* — Eric Keasel
(74) *Attorney, Agent, or Firm* — Panitch Schwarze Belisario & Nadel, LLP

(57) ABSTRACT

A thermal trigger assembly for remote mechanical actuation of another fire protection system component includes an activation component having a base and a movable member. A bias member biases the movable member from a preactivation to an activated position with respect to the base. A thermally responsive element retains the movable member in the preactivation position until a predetermined thermodynamic condition is reached, when the thermally responsive element loses structural integrity. A flexible connector includes a flexible hollow outer cable housing with one end configured to be stationarily (preferably fixedly) connected with the base. A flexible cable is inside the outer cable housing for sliding movement therein and has one end configured to be stationarily (preferably fixedly) connected
(Continued)

with the movable member. The flexible cable is moved with respect to the outer cable housing by movement of the movable member upon loss of structural integrity by the thermally responsive element.

16 Claims, 16 Drawing Sheets

Related U.S. Application Data continuation of application No. 15/222,770, filed on Jul. 28, 2016, now Pat. No. 9,901,763.

(60) Provisional application No. 62/304,585, filed on Mar. 7, 2016, provisional application No. 62/267,445, filed on Dec. 15, 2015, provisional application No. 62/198,428, filed on Jul. 29, 2015, provisional application No. 62/197,927, filed on Jul. 28, 2015.

(51) Int. Cl.
*A62C 37/48* (2006.01)
*A62C 37/11* (2006.01)
*A62C 3/00* (2006.01)
*F16K 31/46* (2006.01)
*F16K 1/20* (2006.01)
*F16K 31/00* (2006.01)

(52) U.S. Cl.
CPC ............ *A62C 37/48* (2013.01); *F16K 1/2007* (2013.01); *F16K 31/002* (2013.01); *F16K 31/465* (2013.01)

(56) References Cited

U.S. PATENT DOCUMENTS

| | | | |
|---|---|---|---|
| 2,506,468 A | 5/1950 | Rider |
| 2,865,225 A | 12/1958 | Huffman |
| 3,309,028 A | 3/1967 | Zieg |
| 3,392,787 A | 7/1968 | Weise |
| 3,419,083 A | 12/1968 | Cholin et al. |
| 3,463,235 A | 8/1969 | Flajole |
| 3,463,236 A | 8/1969 | Flajole |
| 3,616,860 A | 11/1971 | Willms |
| 3,657,942 A | 4/1972 | Sullivan |
| 3,684,023 A | 8/1972 | Champagne |
| 3,722,596 A | 3/1973 | Livingston |
| 3,734,191 A | 5/1973 | Johnson et al. |
| 3,768,567 A | 10/1973 | Weise |
| 3,779,318 A | 12/1973 | Livingston |
| 3,911,940 A | 10/1975 | Johnson |
| 3,924,687 A | 12/1975 | Groos |
| 3,991,829 A | 11/1976 | Johnson |
| 4,046,406 A | 9/1977 | Press et al. |
| 4,082,148 A | 4/1978 | Willms |
| 4,128,128 A | 12/1978 | Mears |
| 4,201,014 A | 5/1980 | Hess |
| 4,220,208 A | 9/1980 | Jackson et al. |
| 4,258,795 A | 3/1981 | Hansen |
| 4,368,782 A | 1/1983 | Bray |
| 4,553,602 A | 11/1985 | Pieczykolan |
| 4,854,388 A | 8/1989 | Wyatt |
| 4,951,755 A | 8/1990 | Barnett et al. |
| 4,976,320 A | 12/1990 | Polan |
| 5,127,479 A | 7/1992 | Stehling et al. |
| 5,188,184 A | 2/1993 | Northill |
| 5,295,503 A | 3/1994 | Meyer et al. |
| 5,396,959 A | 3/1995 | Macdonald |
| 5,415,239 A | 5/1995 | Kotter et al. |
| 5,533,576 A | 7/1996 | Mears |
| 5,609,211 A | 3/1997 | Meyer et al. |
| 5,669,449 A | 9/1997 | Polan et al. |
| 5,775,431 A | 7/1998 | Ondracek |
| 5,967,240 A | 10/1999 | Ondracek |
| 6,029,749 A | 2/2000 | Reilly et al. |
| 6,158,519 A | 12/2000 | Kretschmer |
| 6,666,277 B2 | 12/2003 | Reilly |
| 6,691,790 B1 | 2/2004 | MacDonald, III et al. |
| 6,851,482 B2 | 2/2005 | Dolan |
| 7,032,681 B1 | 4/2006 | Sprakel |
| 7,055,612 B2 | 6/2006 | Jackson et al. |
| 7,104,333 B2 | 9/2006 | Ringer |
| 7,143,834 B2 | 12/2006 | Dolan |
| 7,185,711 B2 | 3/2007 | Jackson et al. |
| 7,322,423 B2 | 1/2008 | Ringer |
| 7,353,881 B2 | 4/2008 | Akins et al. |
| 7,373,720 B1 | 5/2008 | Jensen et al. |
| 7,516,800 B1 | 4/2009 | Silva, Jr. et al. |
| 7,543,653 B2 | 6/2009 | Reilly et al. |
| 7,823,650 B2 | 11/2010 | Eckholm et al. |
| 7,921,928 B2 | 4/2011 | Thompson et al. |
| 8,083,002 B1 | 12/2011 | Golinveaux et al. |
| 8,528,653 B1 | 9/2013 | Silva, Jr. et al. |
| 8,584,767 B2 | 11/2013 | Johnson et al. |
| 8,746,358 B2 | 6/2014 | Alchalel et al. |
| 8,776,903 B2 | 7/2014 | Jimenez et al. |
| 8,800,673 B2 | 8/2014 | Multer et al. |
| 8,844,554 B2 | 9/2014 | Kikuchi et al. |
| 8,887,822 B2 | 11/2014 | Polan |
| 8,973,672 B2 | 3/2015 | Fraederich |
| 9,121,521 B2 | 9/2015 | Girouard |
| 9,339,673 B2 | 5/2016 | Shipman |
| 9,345,918 B2 | 5/2016 | Bucher et al. |
| 9,358,411 B2 | 6/2016 | Shipman |
| 9,395,918 B2 | 7/2016 | Ho et al. |
| 9,415,250 B2 | 8/2016 | Bucher et al. |
| 9,415,256 B2 | 8/2016 | Inzer |
| 9,901,763 B2 * | 2/2018 | Meyer .................. F16K 31/465 |
| 10,646,736 B2 * | 5/2020 | Meyer .................. A62C 37/11 |
| 10,653,908 B2 * | 5/2020 | Meyer .................. A62C 3/004 |
| 2003/0075343 A1 | 4/2003 | Ballard |
| 2003/0132009 A1 | 7/2003 | Thompson |
| 2004/0123989 A1 | 7/2004 | Sprakel et al. |
| 2005/0121206 A1 | 6/2005 | Dolan |
| 2007/0000671 A1 | 1/2007 | Reilly et al. |
| 2007/0007020 A1 | 1/2007 | Chase |
| 2007/0221388 A1 | 9/2007 | Johnson |
| 2007/0267202 A1 | 11/2007 | Mariller |
| 2010/0038099 A1 | 2/2010 | Thompson et al. |
| 2011/0024138 A1 | 2/2011 | Multer et al. |
| 2011/0214888 A1 | 9/2011 | Alchalel et al. |
| 2012/0031630 A1 | 2/2012 | Stephens |
| 2012/0199764 A1 | 8/2012 | Girouard |
| 2012/0298383 A1 | 11/2012 | Shipman |
| 2013/0037281 A1 | 2/2013 | Szentimrey et al. |
| 2013/0199803 A1 | 8/2013 | Multer |
| 2013/0319696 A1 | 12/2013 | Polan |
| 2015/0060091 A1 | 3/2015 | Polan |
| 2015/0075821 A1 | 3/2015 | Bucher et al. |
| 2015/0121206 A1 | 4/2015 | Odonoghue et al. |
| 2017/0028238 A1 | 2/2017 | Meyer et al. |
| 2017/0340911 A1 | 11/2017 | Meyer et al. |
| 2018/0043198 A1 | 2/2018 | Meyer et al. |
| 2018/0361182 A1 | 12/2018 | Meyer et al. |

FOREIGN PATENT DOCUMENTS

| | | |
|---|---|---|
| CN | 103845836 A | 6/2014 |
| CN | 104127979 A | 11/2014 |
| DE | 20209353 U1 | 11/2002 |
| JP | S50083097 U | 7/1975 |
| JP | S51117500 U | 9/1976 |
| JP | 2000153005 A | 6/2000 |
| JP | 2001340485 A | 12/2001 |
| JP | 2003164543 A | 6/2003 |
| KR | 101259098 B1 | 5/2013 |
| WO | 2009108944 A2 | 9/2009 |
| WO | 2017019904 A1 | 2/2017 |
| WO | 2017075070 A1 | 5/2017 |

(56) References Cited

OTHER PUBLICATIONS

Int'l Search Report and Written Opinion dated Feb. 24, 2017 in Int'l Application No. PCT/US2016/066979.
Series MJC Multiple Jet Controls DN20, DN25, DN50, 12 Bar BSPT Inlet & Outlets Threads, TYCO Fire Products Data Sheet, Oct. 2014, downloaded from web page: http://www.tyco-fire.com/TD_TFP/TFP/TFP1346_10_2014.pdf, Download Date: May 24, 2016, original posting date: uknown, 10 pages.
Wilkins, "The Use of Specific Application Sprinklers for Protecting Attics", Tyco Fire & Building Products, pp. 1-92 (Oct. 21, 2007).
Office Action dated Oct. 26, 2015 in U.S. Appl. No. 62/246,561.
Office Action dated Jul. 20, 2017 in U.S. Appl. No. 15/222,770, by Meyer.
Office Action dated Oct. 4, 2017 in U.S. Appl. No. 15/380,605, by Meyer.
Int'l Preliminary Report on Patentability dated Jan. 30, 2018 in Int'l Application No. PCT/US2016/044569.
Int'l Preliminary Report on Patentability dated Jun. 19, 2018 in Int'l Application No. PCT/US2016/066979.
U.S. Appl. No. 62/246,561, filed Oct. 26, 2015.
Int'l Search Report and Written Opinion dated Jul. 27, 2018 in Int'l Application No. PCT/US2018/034148.
Office Action dated Jul. 9, 2018 in U.S. Appl. No. 15/380,605, by Meyer.
Examination Report dated Feb. 14, 2020 in Australian Application No. 2018286522.
Office Action dated Dec. 16, 2020 in Chiniese Application No. 201880059828.0.

\* cited by examiner

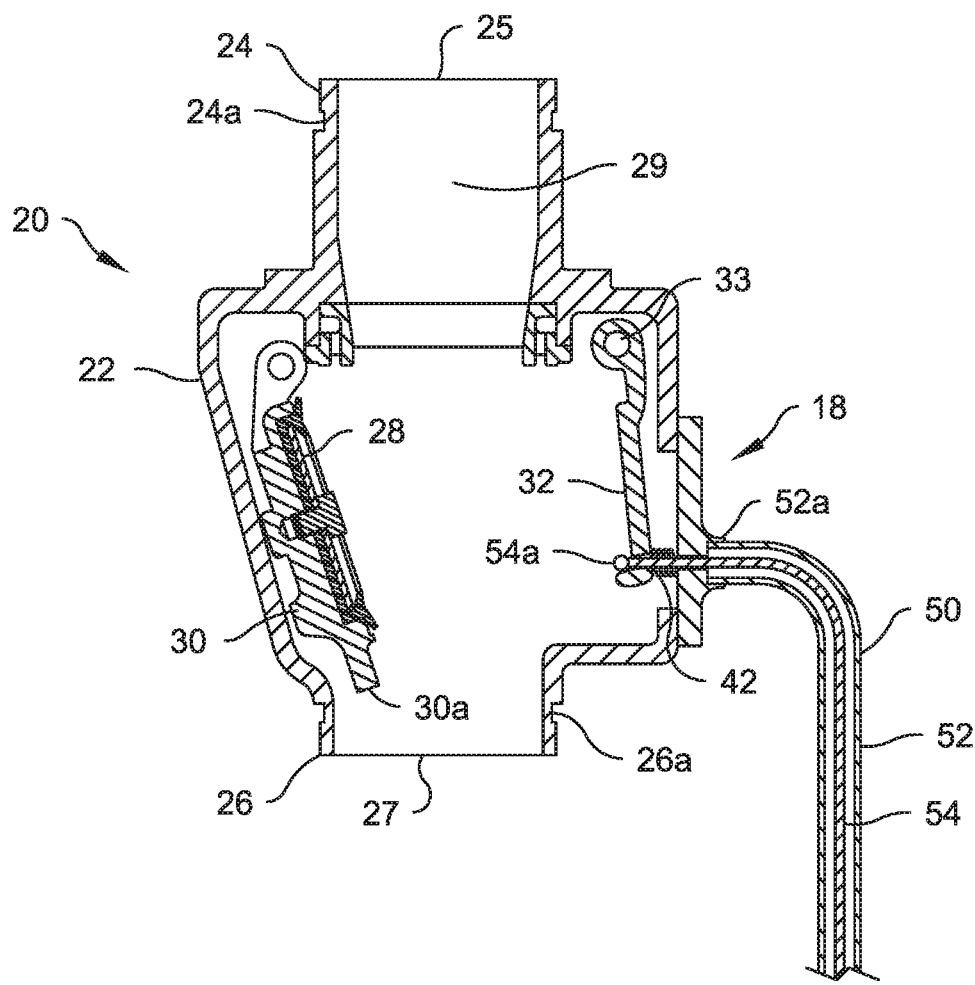
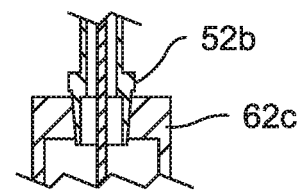
Fig. 3B
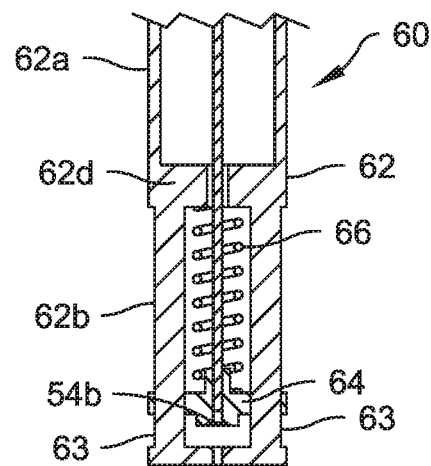

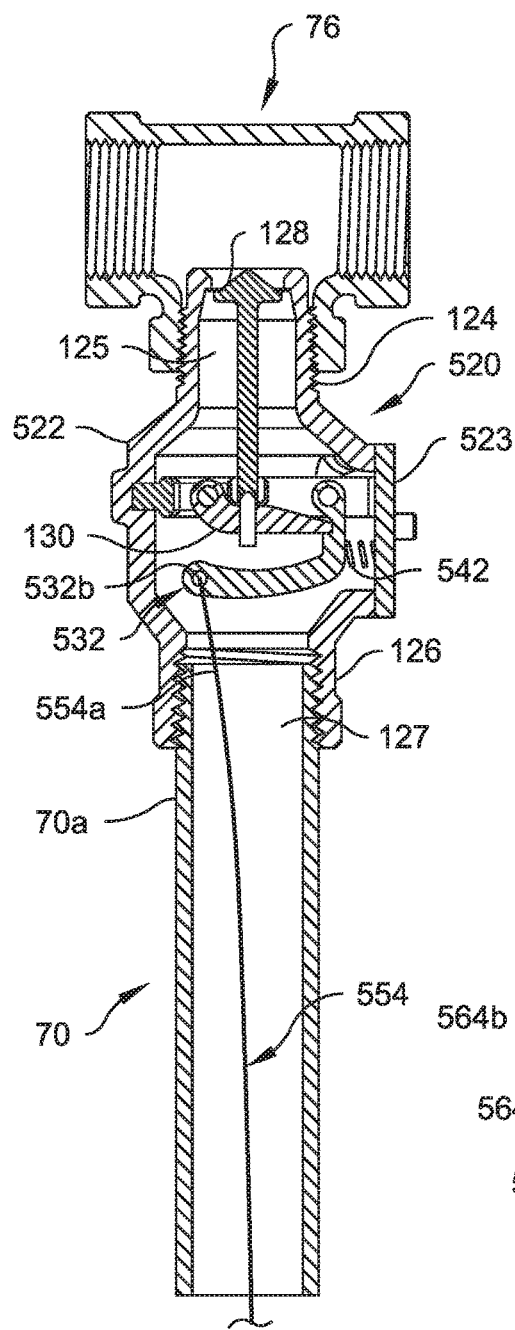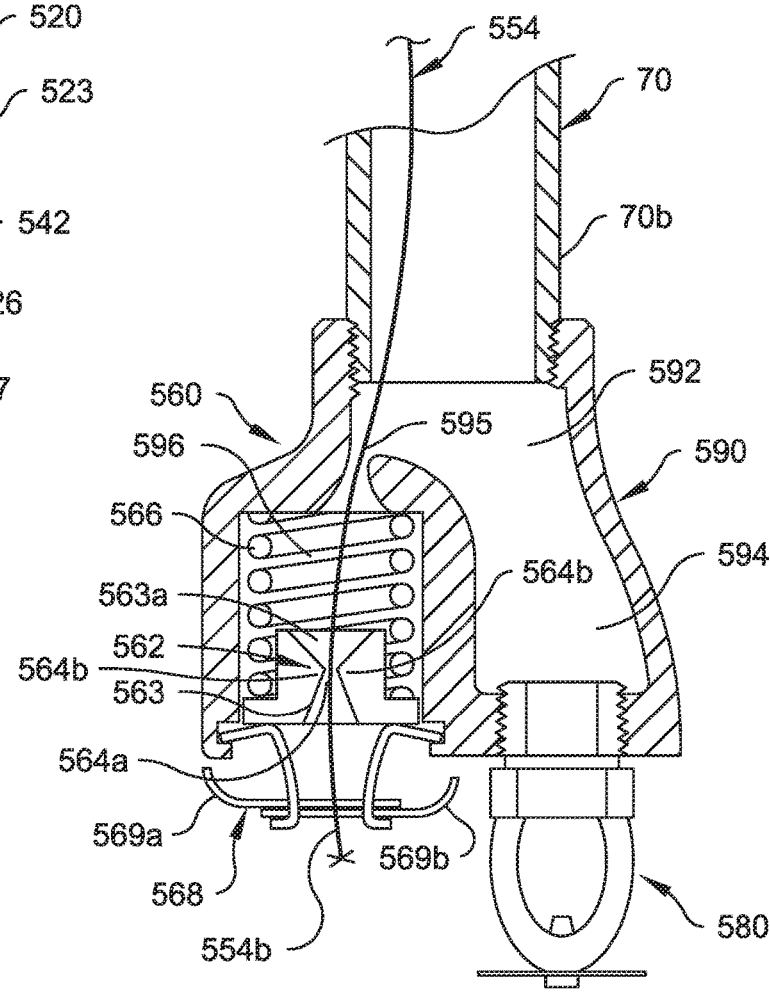
*Fig. 18A*  *Fig. 18B*

PREACTION SPRINKLER VALVE ASSEMBLIES, RELATED DRY SPRINKLER DEVICES AND FIRE PROTECTION SPRINKLER SYSTEMS

CROSS-REFERENCE TO RELATED APPLICATIONS

This application is a continuation of U.S. patent application Ser. No. 15/790,321 filed Oct. 23, 2017, which is a continuation of U.S. patent application Ser. No. 15/222,770 filed Jul. 28, 2016 (now U.S. Pat. No. 9,901,763), which claims the benefit of priority under 35 USC § 119(e) of U.S. Provisional Patent Applications No. 62/304,585 filed Mar. 7, 2016; No. 62/267,445 filed Dec. 15, 2015; No. 62/198,428 filed Jul. 29, 2015; and No. 62/197,927 filed Jul. 28, 2015. The contents of all of the applications listed in this paragraph are incorporated herein by reference in their entirety.

BACKGROUND OF THE INVENTION

The present disclosure relates generally to fire protection, and, more particularly, to activation components for fire protection systems, and valves for use in fire protection systems.

Fire sprinkler system installation and operation are subject to nationally recognized codes.

As is aptly pointed out in U.S. Patent Application Publication No. 2013/0199803, dry sprinklers are used in areas that are or may be exposed to freezing conditions, such as in freezers, unheated internal areas, walkways, etc. In typical dry-pipe systems, supply conduits run in a space where the water in the supply conduit is not subject to freezing. A dry sprinkler is attached to such supply conduit and extends into a space where the water would otherwise be subject to freezing.

As Publication No. 2013/0199803 further points out, the typical construction of a dry sprinkler comprises a tube ("drop") with a pipe connector at the inlet end of the tube (for connecting the inlet end to the supply pipe network of the fire suppression system), a seal member at the inlet end to prevent water from entering the tube, and a mechanism to maintain the seal at the inlet end until the sprinkler is activated. Typically, a nozzle with an outlet and a deflector is attached to the opposite, outlet end of the tube. Also, the tube is sometimes vented to the atmosphere to allow drainage of any condensation that may form in the tube. Such dry sprinklers are disclosed, for example, in U.S. Pat. No. 5,775,431. As shown generally in that patent, the actuating mechanism can include a rod or other similar rigid structure that extends through the tube between the nozzle end and the inlet end to maintain a seal at the inlet end. The actuating mechanism further may include a thermally responsive element that supports the rod or the like at the nozzle end and thereby supports the seal at the inlet end. Alternatively, the tube is also sealed at the nozzle end of the tube, and the rod is supported at the nozzle end by the seal member which is itself supported by the thermally responsive support element. In such arrangements, the space in the tube between the two seal members can be pressurized with a gas, such as dry air or nitrogen, or filled with a liquid such as an antifreeze solution. When an elevated temperature is experienced, the thermally responsive support element fails, thereby allowing the rod to move releasing the inlet end seal (and also any outlet seal at the nozzle end of the tube) to allow water from the supply conduit to flow into and through the tube to the nozzle.

The rigid tube or "drop" portion of such conventional dry sprinklers of the type in U.S. Pat. No. 5,775,431 extends with the nozzle into the unheated area from a wet branch line (located in a heated area) and must be precisely aligned and installed while avoiding various architectural, structural, and mechanical obstructions typically found in commercial or industrial buildings. The installer has to first install wet main and branch supply line piping for a sprinkler system and then measure a suitable length for each dry sprinkler from the branch line to the desired height of the nozzle with respect to a ceiling or the like, as the spacing between the branch and the ceiling or desired position of the nozzle is generally not some accurately predetermined distance. Because the actuation rod has to extend between the inlet seal and the nozzle outlet seal or other support at the outlet end, each dry sprinkler like that in U.S. Pat. No. 5,775,431 is custom made for a given length. An installer will order dry sprinklers for the installation according to the lengths that are measured to within a fraction (i.e. ⅛) of an inch. Delivery typically takes a minimum of seven to ten business days and, depending upon backlog, can take weeks. This delays installation and completion of construction projects. Longer delays occur if mistakes are made in measuring or fabricating the sprinklers or the sprinklers are damaged in transit and replacement sprinklers required, further delaying completion of the installation.

Some manufacturers have addressed installation difficulties at least by providing dry sprinklers with an integral "flexible" drop tube. U.S. Patent Application Publication No. 2013/0199803 discloses such a "dry" sprinkler. Here, a seal 4 at the inlet end of the drop tube 1 is held in place by pressurized fluid between the seal 4 and a seal 12 at the outlet end of the tube at the sprinkler head. While this arrangement provides some flexibility with respect to installation and fabrication by the installer and manufacturer, it leaves the end user with a complicated pressure regulation system to maintain to assure that pressure in the flexible tube is held at an adequate level to prevent water leakage through the inlet end seal from the branch supply line.

A different type of dry sprinkler 12 with a flexible drop 14 is disclosed in U.S. Pat. No. 8,887,822. A flexible link 56 is passed through the center of the integral flexible drop 14 between a pivoting valve member such as a clapper 44 and a plug 24 held in the sprinkler outlet of the nozzle 20 by a fusible element 22. The link 56 is sufficiently flexible so as to conform to bending of the flexible drop 14. Activation of the sprinkler by disintegration of the fusible element 22 at the orifice 22 releases the plug 24 and a spring 66 that pulls on one end of the link to remove an opposing end of the link positioned in something called an "X brace valve latch" 54 holding the clapper 44 closed. This sprinkler can be pressurized with appropriate fluid or opened to atmosphere through vent holes 98. However, what is not explained is what assures that the latch 54 will be cleanly released as it must slide through the elbow without twisting and remove itself from the path of the clapper 44. Also, internal braces 64 have to be provided at any significant bend of the tube 14 or there is a danger that the flexible link 56 will be allowed to go sufficiently slack so as not to be pulled from the latch when the thermally response element triggers.

U.S. Patent Application Publication No. 2013/0319696 discloses another dry sprinkler 100 with an integral flexible drop tube 3 connecting a threaded inlet 1 and an opposing outlet 2. This is an alternative arrangement to assure that a flexible link 10 extending between an inlet valve assembly 13 and an outlet plug 53 does not go slack from bends in the tube, regardless of where the bends in the tube are located.

The sprinkler 100 is activated by collapse of the frangible element 56 retaining the plug 53 and spacer 45, permitting the spacer 45 to move and pull the link 10, which mechanically fractures the bulb 11 at the inlet end by twisting a collar 36 on the bulb 11. In the one example given in para. 38, approximately one-half inch of slack can be taken up by the arrangement.

Because of their designs, dry sprinklers must be fabricated to within a fraction of an inch of their installed length, even with flexible tubes. Even the dry sprinkler disclosed in U.S. Patent Application Publication No. 2013/0319696 allows only a larger fraction of an inch leeway than the other, previously identified dry sprinklers. As a result, all must be ordered from and fabricated by a manufacturer, at great expense and time to the installer and end purchaser compared with wet sprinkler system installations.

Although U.S. Patent Application Publication No. 2012/0298383 describes the provision of dry sprinklers with flexible tubes (also known as flexible drops) and weep holes, in practice all or nearly all commercially available, flexible tube equipped dry sprinklers are provided with a relatively long flexible tube having an equally long inner tube that keeps the seal assembly closed. Under pressure, there is deformation in the flexible tube, and there have been issues with leakage if the flexible tube is used by itself without an inner tube.

Another disadvantage of the flexible drop is that it requires a bracket that has to be connected to the ceiling, so there may be limits to the type of ceiling and structure where it can be installed.

It would revolutionize the fire protection industry for installers to be able to fabricate and install on site, a dry sprinkler equivalent to a wet sprinkler system, without employing custom measured and factory built dry sprinkler assemblies.

BRIEF SUMMARY OF THE INVENTION

Briefly stated, in a preferred embodiment of the present invention, a thermal trigger assembly is configured for remote mechanical actuation of another fire protection system component. The thermal trigger assembly includes an activation component having a base and a movable member that is movable with respect to the base. A bias member is located with respect to the base to bias the movable member from a preactivation position with respect to the base to an activated position with respect to the base. A thermally responsive element retains the movable member in the preactivation position only until a predetermined thermodynamic condition is reached. The thermally responsive element is configured to lose structural integrity under the predetermined thermodynamic condition. A flexible connector includes at least a flexible hollow outer cable housing with a first end and a second end, the second end configured to be stationarily connected with the base of the activation component. A flexible cable is slidably located inside the flexible hollow outer cable housing for only sliding movement within the other cable housing and has a first end and a second end, with the second end being configured to be stationarily connected with the movable member of the activation component. The flexible cable is moved with respect to the flexible hollow outer cable housing by movement of the movable member with loss of structural integrity by the thermally sensitive member at the predetermined thermodynamic condition.

In another aspect, in a preferred embodiment of the present invention, a dry sprinkler device includes a valve. The valve has a body with an inlet, at least one outlet, and a fluid passageway connecting the inlet with each outlet. A seal member is supportable across the passageway to close the passageway by a pivotally mounted lever. The seal member is supported across the passageway in a sealing position by a latch releasably engaged with the lever. An activation component includes a base and a movable member that is movable with respect to the base. A bias member is located with respect to the base to bias the movable member from a preactivation position with respect to the base to an activated position with respect to the base. A thermally responsive element retains the movable member in the preactivation position only until a predetermined thermodynamic condition is reached. The thermally responsive element is configured to lose structural integrity under the predetermined thermodynamic condition. A flexible connector includes at least a flexible hollow outer cable housing having a first end connected with the body and a second end connected with the base of the activation component. A flexible cable is located inside the flexible hollow outer cable housing and sized for only sliding movement within the outer cable housing. The flexible cable has a first end configured to be mechanically connected with the latch and a second end engaged with the movable member of the activation component to move with the movable member. At least one water distribution device is fluidly coupled with the at least one outlet.

In another aspect, a preferred embodiment of the present invention is a method of providing a dry sprinkler device. The method includes connecting an inlet of a valve to a branch water line. The method also includes mechanically connecting an activation component having a thermally responsive element to the valve with a Bowden cable so as to open the valve in response to a loss of physical integrity of the thermally responsive element. The method also includes fluidly connecting a water distribution device to an outlet of the valve to spray water received from the valve.

In another aspect, a preferred embodiment of the present invention is a method of installing a dry sprinkler device. The dry sprinkler device includes a valve, an activation component with a thermally responsive element, and a flexible Bowden cable. The Bowden cable mechanically couples the activation component with the valve so as to open the valve in response to a loss of physical integrity of the thermally responsive element. The method includes fluidly coupling an inlet of the valve with a water supply line. The method also includes installing a water distribution device at a location spaced apart from the valve. The method also includes connecting the device with an outlet of the valve through intermediate piping. The method also includes installing the activation component at a location spaced apart from the valve. The valve is operatively connected with the activation component through the Bowden cable.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 3B is a cross-sectional elevation diagrammatic view of the assembly of FIGS. 2 and 3A, following activation of the assembly;

FIGS. 18A and 18B depict an additional form of a dry sprinkler device.

DETAILED DESCRIPTION OF THE INVENTION

Figure 1:
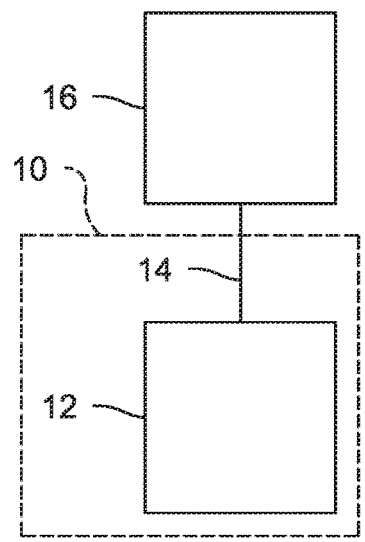
FIG. 1 is a diagrammatic view of a thermal trigger assembly of the present invention including an activation component connected with another fire sprinkler system component via a flexible connector in accordance with the invention.

Certain terminology is used in the following description for convenience only and is not limiting. The words "lower," "bottom," "upper," "top," "front," "back," and "rear" designate directions in the drawings to which reference is made. The words "inwardly" and "outwardly" refer to directions toward and away from, respectively, the geometric center of the component being discussed, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

As shown in FIG. 1, in a preferred embodiment of the present invention, a thermal trigger assembly 10 is configured for remote mechanical actuation of another fire protection system component 16. The thermal trigger assembly 10 includes an activation component 12 and a flexible connector 14 configured to allow the activation component 12 to remotely mechanically actuate another fire protection system component 16, which in some preferred embodiments (discussed below) is a valve for discharging water into one or more sprinklers, a switch or a relay having a throw, a magnet (such as a Reed switch or relay) or an equivalent that can be mechanically moved or another type of fire-protection system device actuatable by a mechanical input.

Figure 2:
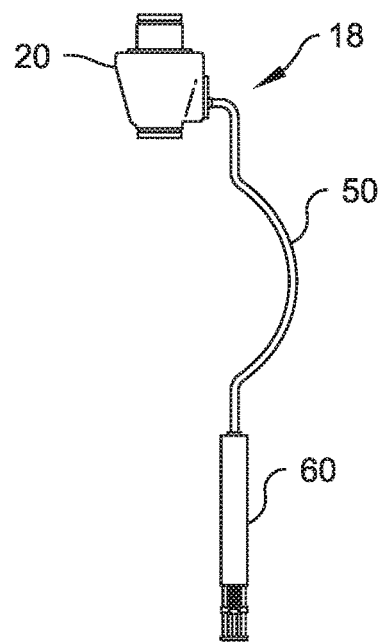
FIG. 2 is a diagrammatic view of an activation component of a trigger assembly connected with another fire sprinkler system component, a valve, via a flexible connector of the assembly in accordance with a preferred embodiment of the invention, to provide a preaction valve-assembly.

In another preferred embodiment, as shown in FIG. 2, a thermal trigger assembly 10 includes an activation component 60 and a flexible connector 50 configured for remote mechanical actuation of another fire protection system component 20, which as depicted in FIG. 2 is a valve. This combination in FIG. 2 provides a remotely, mechanically triggered or, as will be seen, a preaction valve 18.

Figure 3A:
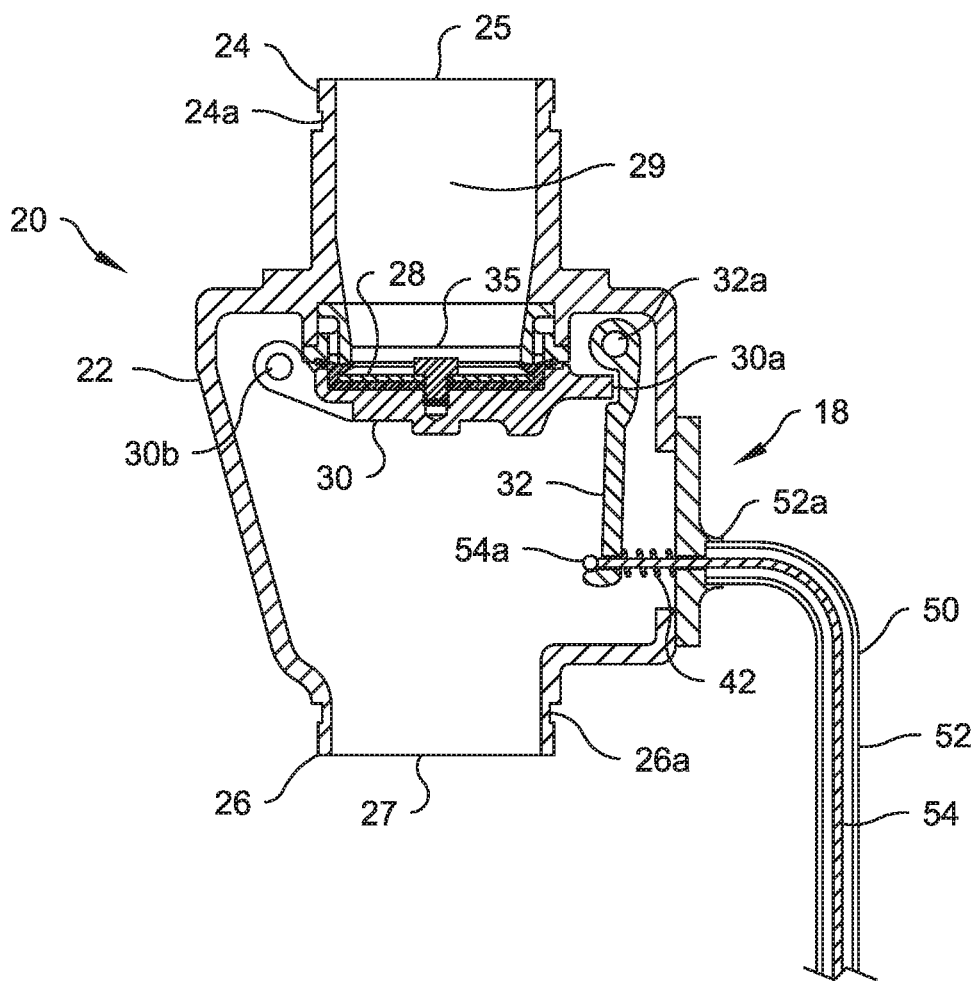
FIG. 3A is a cross-sectional elevation diagrammatic view of the FIG. 2 assembly in accordance with a preferred embodiment of the invention, shown prior to activation of the device.
Figure 3A:
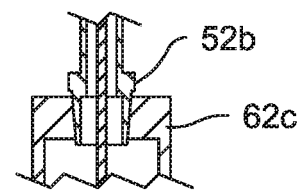
Figure 3A:
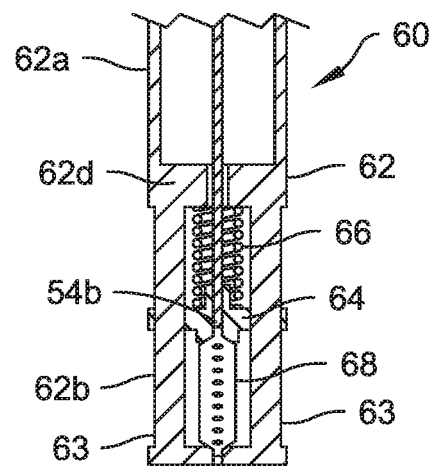

Details of a first preferred valve 20, a clapper type valve, and of the flexible connector 50 and activation component 60 of the thermal trigger assembly are shown in FIGS. 3A and 3B. The thermal trigger assembly 10 includes an activation component 60 having a base 62 and a movable member 64 that is movable with respect to the base 62. A bias member 66 is located with respect to the base 62 to bias the movable member 64 from a preactivation position, shown in FIG. 3A, with respect to the base 62 to an activated position, shown in FIG. 3B, with respect to the base 62. The bias member 66 is selected to generate a force overcoming the bias of any opposing bias member—in this example, a bias member 42, discussed below—and to move a movable part, a latch 32 of the other component, valve 20. A thermally responsive element 68 retains the movable member 64 in the preactivation position only until a predetermined thermodynamic condition is reached. The thermally responsive element 68 is configured to lose structural integrity under the predetermined thermodynamic condition. A flexible connector 50 includes at least a flexible hollow outer cable housing 52 with a first end 52a and a second end 52b, the latter being at least being configured to be at least stationarily connected with the base 62. The base 62 includes an upper, spacer portion 62a from which extends a sensing portion 62b. The housing 62 may be one piece but might conveniently be made of an assembly of joined parts. The flexible connector 50 includes a flexible inner member 54 with opposing first 54a and second 54b ends. The first end 54a of the flexible inner member 54 is configured to be mechanically connected with and preferably fixedly connected with the movable part, the latch 32 of valve 20, while the second, opposing, remaining end 54b is configured to be mechanically and preferably fixedly connected with the movable member 64 so as to move with movable member 64. The second end of the outer cover 52b is received in and preferably fixedly connected with the upper end 62c of the spacer portion 62a. As shown in FIGS. 3A and 3B, the first end 52a of the flexible hollow outer cable housing 52 is configured for stationary and preferably fixed connection with the other fire protection component 20 and preferably to the body 22 of clapper valve 20.

Flexible connector 50 is preferably a Bowden cable in which inner member 54 is slidably located inside the flexible hollow outer cable housing 52 for only sliding movement within the outer cable housing 52. The phrase, only sliding movement, is meant to mean that the flexible inner member 54 is sufficiently close fitting in the outer housing 52 that the inner member cannot buckle or meaningfully deflect within the outer housing 52 so that there is no lost movement or essentially no lost movement between the ends of the inner member 54 within the outer housing 52. The flexible inner member 54 is moved with respect to the flexible hollow outer cable housing 52 by movement of the movable member 64 with loss of structural integrity by the thermally responsive element 68 under the predetermined thermodynamic condition. The thermally responsive element 68 includes a wide range of devices known in the art, including alcohol- or other liquid-filled glass bulbs (as shown in FIGS. 3A and 3B), fusible links (1168 in FIG. 14), and other solder-based links or assemblies which fail in response to being heated sufficiently to at least a predetermined temperature, permitting movement to occur, and bi-metallic disks. The flexible inner member 54 may be a single flexible wire or a flexible cable made from a bundle of wires. Hereinafter the flexible inner member may also be referred to as simply the flexible cable.

In the example depicted in FIGS. 3A and 3B, the member 64 of the activation component 60 is slidably mounted on the sensing portion 62b of the base 62. The sensing portion 62b might be formed by a pair of rods 63 extended between an intermediate transverse portion 62d, which might be the bottom transverse wall of a cylinder forming the spacer portion and receiving a cap forming the upper end 62c of the housing and supporting the rods 63 themselves supporting the bottom transverse portion 62e. In a preactivation position of the device, the movable member 64 is restrained by the thermally sensitive element 68. The transverse portions 62d and 62e provide the resistive support of the bias member 66 and thermally sensitive element 68, respectively.

As depicted in FIGS. 3A and 3B, the other fire protection component 20 is a clapper valve 20 according to a preferred embodiment of the invention. The valve 20 has a body 22 with an inlet end 24 and an inlet 25, an outlet end 26 with an outlet 27, and a fluid passageway 29 between the inlet 25 and the outlet 27. The inlet end 24 has a groove 24a for connecting to a water supply. The outlet end 26 has a groove 26a for connecting to a sprinkler head or other water distribution device or system. Other forms of connection, such as threaded connections, could be used at the inlet end 24, the outlet end 26, or both ends. A removable cover 23 provides access to the interior of the body 22 and is attached to the first end 52a of the flexible hollow outer cable housing 52. A seal member 28 supportable across the passageway 29 to close the passageway 29 by a pivotally mounted lever 30 with a tang 30a. The seal member 28 is supported across the passageway 29 in a sealing position by a latch 32 engaged with the tang 30a of the lever 30. A screw 35 secures the seal member 28 to the lever 20. The flexible cable 54 has a first end 54a mechanically coupled with the latch 32 for movement of the latch 32 with respect to the lever 30 by movement of the first end 54a of the flexible cable 54. The latch 32 pivots around a latch pivot 32a, which is a pinned connection. Similarly, the lever 30 pivots around a lever pivot 30b, which is also a pinned connection. The pressure of water at the inlet 25 forces the seal member 28 and the lever 30 back away from the inlet 25 and into the central chamber 40, permitting water to flow around past the lever 30 and the latch 32 and through the outlet 27.

Figure 4:
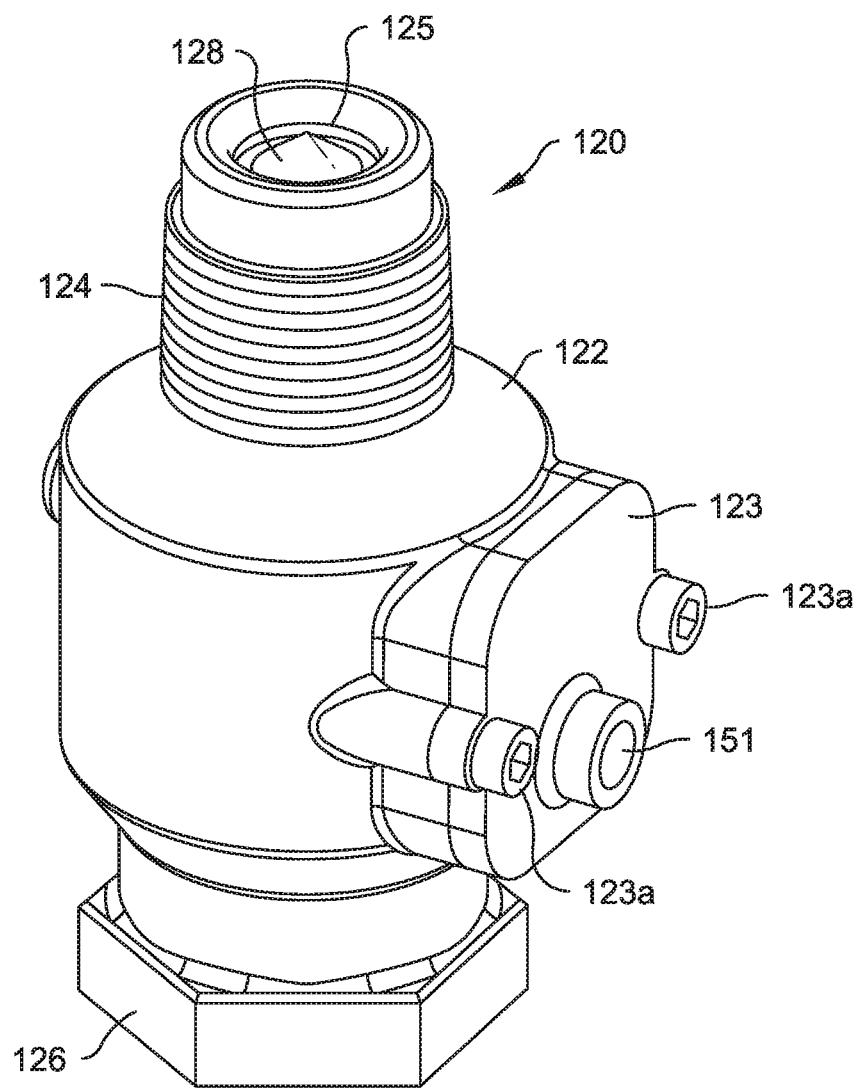
FIG. 4 is a perspective diagrammatic view of a second embodiment valve component of a preaction sprinkler valve assembly in accordance with a preferred embodiment of the invention.
Figure 5:
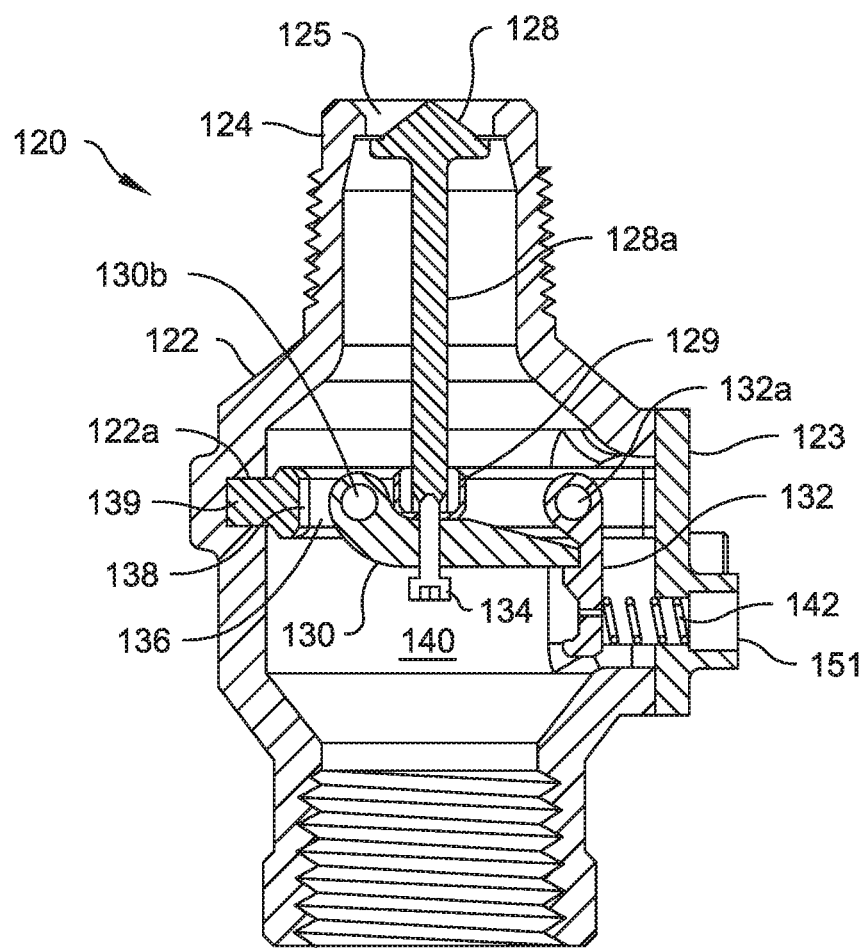
FIG. 5 is a cross-sectional elevation diagrammatic view of the valve component of FIG. 4 before activation.
Figure 6:
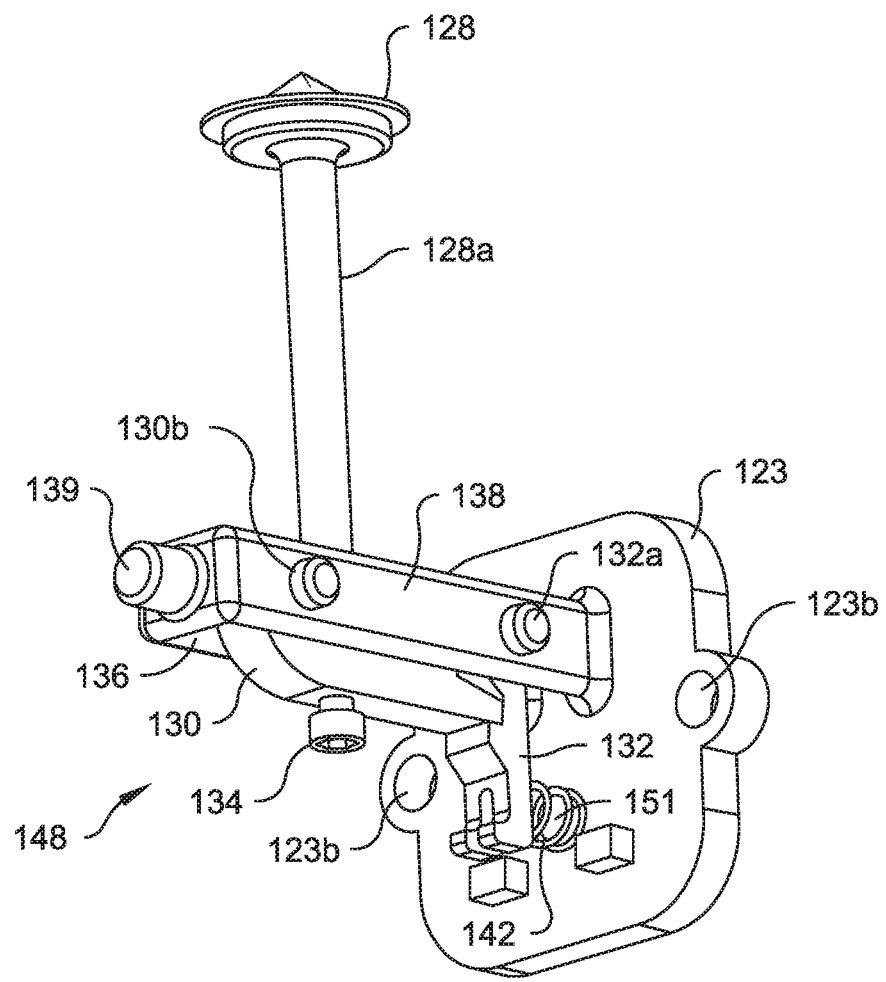
FIG. 6 is a perspective view of a lever-latch assembly mounted to a removable cover of the valve component in accordance with a preferred embodiment of the invention.

FIGS. 4-6 depict a second embodiment of a valve component 120 of the invention in the form of a poppet valve. The valve component 120 again includes a body 122 with an inlet end 124 externally threaded to be received in a Tee in or a threaded pipe from a wet supply line and an outlet end 126 internally threaded to receive an externally threaded length of piping. A seal member 128 is supported in the inlet 125 by a pivotally mounted lever 130 retained in a "closed" or "supporting" position by a pivotally mounted latch 132. An adjustment screw 134 can be provided in the lever 130 to vary the mechanical compression provided on the seal member 128. Two parallel cross-members 136, 138 span an enlarged central chamber 140 of the body 122 and terminate in a pin 139 received in a bore 122a in an inner side wall of the body 122 distal to a removable cover 123. The cross members 136, 138 support pivots for the lever 130 and the latch 132. A hollow boss 129 formed between the cross members 136, 138 slidably receives the shaft portion 128a of the seal member 128. A first bias member, for example, a compressed coil spring 142 biases the latch 132 into releasable engagement with the lever 130. The latch 132 is configured to be connected with an activation assembly and flexible connector as previously described. The latch 132 pivots around a latch pivot 132a, which is a pinned connection. Similarly, the lever 130 pivots around a lever pivot 130b, which is also a pinned connection The latch 132 is adapted to connect with a first end of a flexible cable of a flexible connector, while a port 151 is provided in the cover 123 for receiving a first end 152a of an outer cable housing 152 of the flexible connector. drop tube fabricated by the installer. In FIG. 6, a support subassembly 148 is shown removed from the valve body 122. The lever 130 and the latch 132 are part of the subassembly 148 pivotally supporting the lever 130 and the latch 132 and fixedly connected to a cover 123 removable from the valve body 122. The subassembly 148 includes the hollow boss 129 slidably receiving the shaft 128a of the seal member 128. The lever 130 includes the adjustment screw 134 located to contact a distal end of the shaft and 128a to vary mechanical compression applied to the seal member 128 by the lever 130 in the closed position. The cover 123 is secured by two screws 123a (FIG. 4) through two screw holes 123b (FIG. 6).

It is expected that the valve component 120 will be rated for a maximum operating pressure of 250 psi, in which case it would be tested by a testing laboratory for many hours at that pressure or slightly higher without leakage for approval. It is suggested that for testing during manufacture, the valve component 120 need only to sustain a pressure twice as great as the rated pressure without leakage for a short period of time (e.g. seconds). With an approximately three-quarter inch diameter inlet 125, a 250 lbs force Belleville washer in the seal member 128, and 500 psi water pressure (twice the expected rated maximum operating pressure) on the seal member, the total load on the lever 130 would be approximately 460 lbs. By proper dimensioning and locating of the lever 130 and the latch 132, in particular, locating the contact point between the lever 130 and the latch 132 along or at least near a transverse center line across the latch pivot 132a to eliminate or minimize any moment on the latch 132, a force of only 20 lbs from compression spring 142 will maintain the latch 132 engaged with the lever 130 and thus will keep the valve component 120 closed. There is no tension on the flexible cable 54 when the valve 120 is closed;

and, in a worst case, tripping the valve at 500 psi requires only about 100 lbs force for the cable 54 to pull. Thermally responsive elements such as 68 are rated to sustain force loads of up to 200 lbs, so that the provision of a 1000 lbs force spring for the bias member 66 is achievable.

Operation of the valve component 20 or 120 by means of the thermal trigger assembly 10 is straight forward. The valve component 20, 120 is installed in the configuration of FIG. 3A or FIG. 5, respectively. When the thermally sensitive element 68 is heated to a predetermined thermodynamic condition to break, the movable member 64 is released. The bias member 66 is selected to generate a force overcoming the bias of the bias member 42 and pivot the latch 32 or 132 out of engagement with the tang 30a of lever 30 or lever 132. The pressure of water at the inlet 25, 125 forces the seal member 28, 128 and the lever 30, 130 back away from the inlet 25, 125 and into the central chamber 40, 140, permitting water to flow around past the lever 30, 130 and the latch 32, 132 and through the outlet 27, 127.

Figure 7:
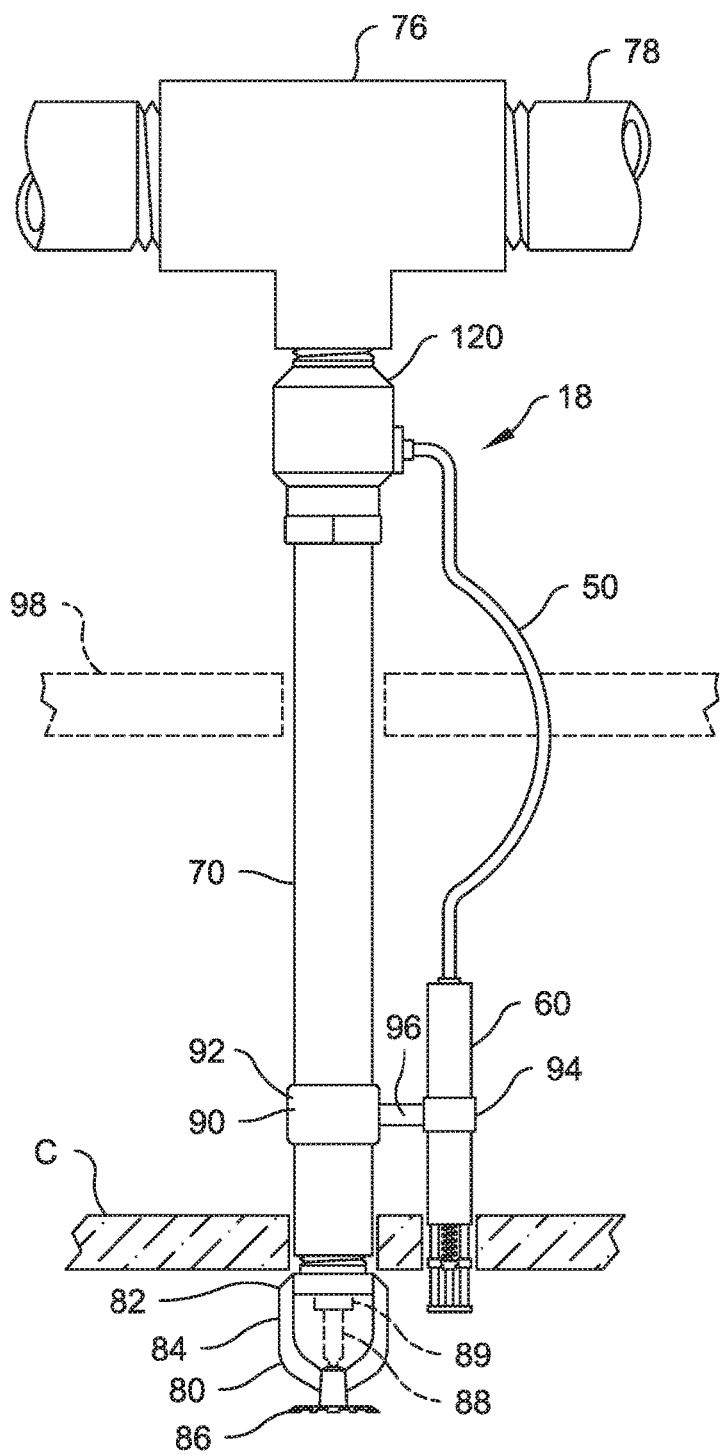
FIG. 7 is a is a side elevation diagrammatic view of a preaction valve assembly incorporating the second embodiment valve of FIGS. 4-6 installed with a drop tube and a conventional sprinkler head to provide a dry sprinkler device in accordance with a preferred embodiment of the invention.

FIG. 7 depicts how a thermal trigger assembly 10 might be installed with a valve like 120 with a drop tube 70 and sprinkler head 80. Here the fire protection system component 16 is a valve component 120 and is threaded into a Tee 76 that is installed along a branch or main wet supply line 78 above a thermal barrier which may be a ceiling C or a separate barrier 98 (in phantom) that keeps the valve component 120 from freezing. In this installation, the flexible connector 50 is freely self-supported between the valve component 20 and the activation component 60, but the flexible connector 50 could be wound loosely around the drop tube 70 to take up any excess length of the connector 50.

The sprinkler head 80 can be any conventional, testing laboratory approved, automatic sprinkler head. It has a body 82 with arms 84 supporting a deflector 86 and, optionally, a second thermally responsive element 88 itself supporting a conventional plug seal 89 in the outlet of the head 80. Without thermally responsive element 88 and plug 89, sprinkler 80 is an "open" sprinkler. If the sprinkler is installed in an area subject to freezing temperatures, it must be installed open so as not to trap any water in it or the drop that might freeze. In this way, virtually any open wet sprinkler can be installed as a dry sprinkler device using a preaction valve assembly 20 or 120, 50, 60 of the present invention.

The activation component 60 can be configured to be held in operating position in various ways. In FIG. 7, a bracket 90 has opposing, first and second ends 92 and 94 that can be clamped around the drop tube 70 and spacer portion 62a of housing 62, respectively. Although a single fastener 96 (e.g. nut and bolt) is shown clamping two bracket halves together, separate clamps could be provided at either end to permit more variability in the diameter of the drop tube 70 on which it is used. Other possible alternatives (not depicted) where the sprinkler head or drop is passed through a ceiling C are to clamp the housing 62 to the ceiling with an escutcheon plate and backer on opposite sides of the ceiling or through a modified recessed pendent sprinkler can that is itself fixed in the ceiling. These exemplary mountings should not be considered limiting.

The thermal trigger assembly of the invention controls water flow to at least one water distribution device, which may take the form of an automatic fire sprinkler 80 with a thermally responsive element 88 and plug 89, or an open fire sprinkler lacking a thermally responsive element and plug. A significant advantage of this invention applies to a conventional automatic sprinkler that has been certified by a testing laboratory. A certified automatic sprinkler, when installed open, without a thermally responsive element or plug in the sprinkler itself, and in combination with a preaction valve assembly formed by a thermal trigger assembly 10 and valve 20, 120, can become a certified equivalent of a dry sprinkler. Normally, any new dry sprinkler must pass a complete UL199, FM2000, or other certification program, which includes tests such as distribution, corrosion, and a long litany of other tests, possibly including very expensive fire tests. The benefit of the preaction valve assembly formed by thermal trigger assembly 10 with a valve 20, 120 is that it can be assembled together with any laboratory-certified open sprinkler. Only a minimum number of certification tests of the previously approved automatic sprinkler in combination with the preaction valve assembly should be required for approval of the assembly as a dry sprinkler device.

Figure 8:
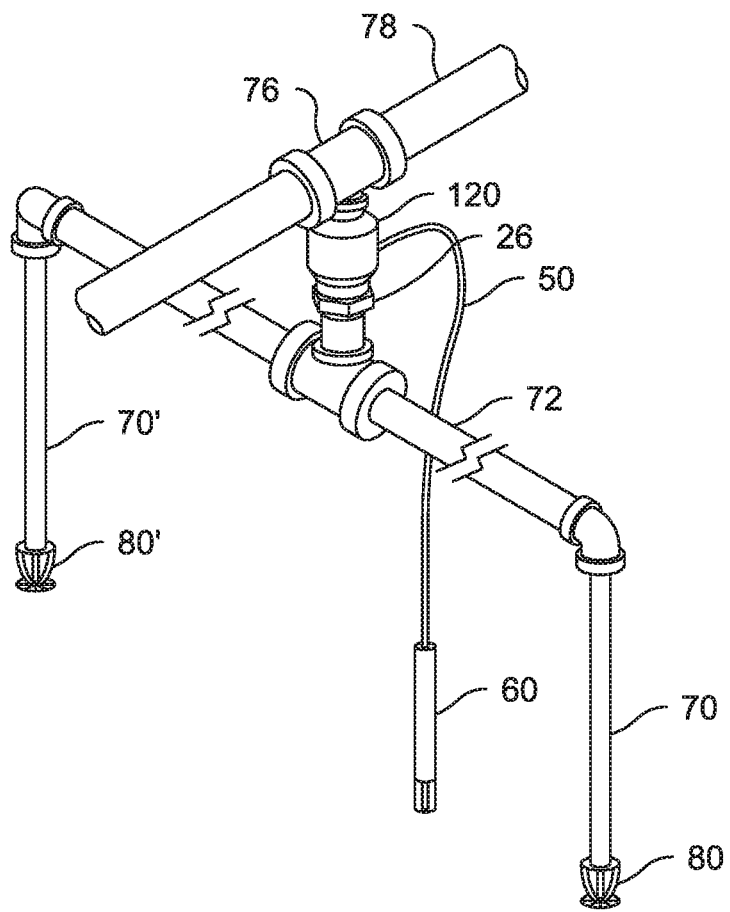
FIG. 8 is a perspective diagrammatic view of the preaction valve assembly of FIG. 7 connected simultaneously via a manifold with multiple sprinkler heads.

Since the thermal trigger assembly controls water flow through a valve component rather than an open sprinkler head, a valve component of the present invention can be used to fluidly connect to and control water flow in more than one fire sprinkler. For example, in FIG. 8, a valve component 120 (or 20) is connected to a water supply line 78 on a Tee 76 and its outlet end 26 is connected to piping in the form of a dry manifold 72 that, in turn, supports at least two wet, open, pendent sprinkler heads 80, 80' from dry drop tubes 70, 70'. More sprinklers could be connected to the valve component 120 (or 20) by bigger manifolds with more drop tubes. Of course, the valve component 120 or 20 would have to be sized to service the number of sprinkler heads which it supplies.

Figure 9:
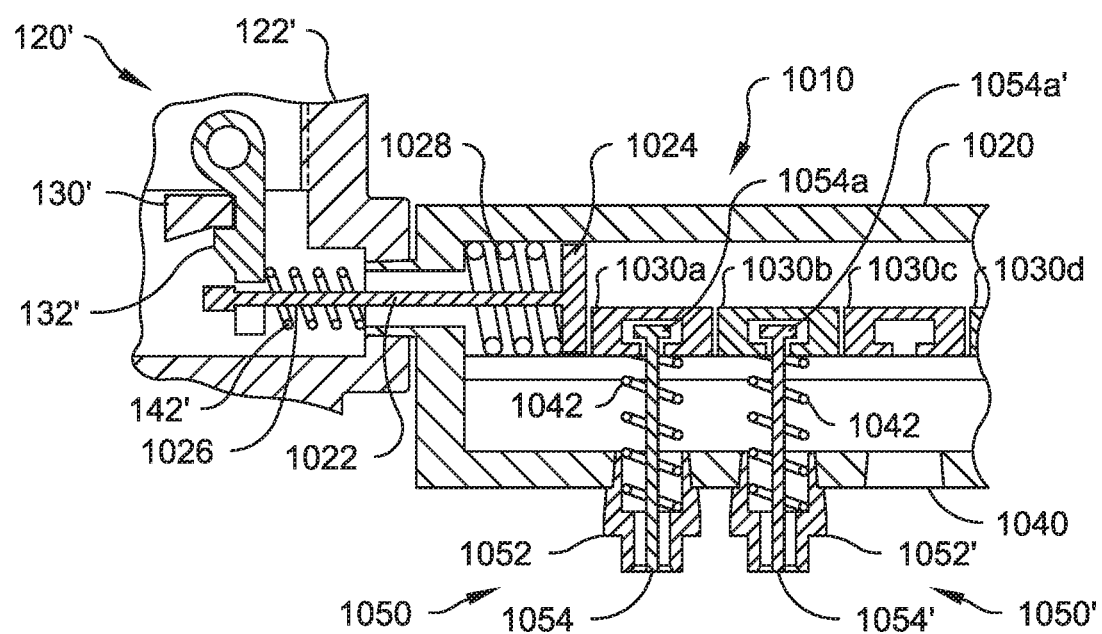
FIG. 9 is a diagrammatic sectioned view of a manifold connection of a valve component of the invention with multiple activation components through multiple flexible connectors in accordance with a preferred embodiment of the invention.

In FIG. 9, a valve body 122' of a valve component 120' of the present invention is configured to be responsive to multiple activation components 60 (not depicted). A lever 130', a latch 132', and a bias member 142' remain essentially the same as those of valve component 120. An activation manifold 1010 has a housing 1020 that attaches, or is attached to, or is even formed as part of the valve body 122'. A head portion 1024 of a plunger 1022 is slidably located within the housing 1020. An end of a shaft 1026 portion of the plunger 1022 distal to the head 1024 is connected with the latch 132' for activation of the valve component 120'. A bias member 1028 generating a force greater than that generated by the bias member 142' is provided in the housing 1022 to bias the plunger 1022 away from the valve body 122'. The plunger 1022 is restrained by a plurality of spacer blocks 1030a, 1030b, 1030c, etc. within the housing 1020. Each spacer block 1030 is opposite a port 1040 in the housing 1020 which is configured to receive a first end 1050a, 1050a' of a separate flexible connector 1050, 1050', each connector 1050, 1050' being connected with a separate activation mechanism (not depicted) like 60 or an equivalent. A first end 1054a, 1054a' of a flexible cable 1054, 1054' of each connector 1050, 1050' is engaged with a separate one of the spacer blocks 1030a, 1030b, . . . . A bias member 1042 may be provided around each cable 1054, 1054' to assure that the related spacer 1030a, 1030b, remains in position in contact with the plunger 1022 and/or the adjoining spacers 1030 or an end of the housing 1020 (not depicted) distal to the valve body 122'. The bias member 66 of each activation component 60 is sufficiently strong to overcome the related bias member 1042, if provided, and any frictional force holding the spacer block 1030 in place. The triggering of any activation component 60 connected through one of the flexible connectors 1050, 1050' with one of the spacer blocks 1030 will pull that spacer block (down in the figure) out of engagement with at least an adjoining spacer block 1030 permitting the bias member 1028 to move the plunger 1024 away from the valve body 122' thereby triggering the valve component 120'. The described devices mechanically couple the first ends 1054a, 1054a' of the flexible cables 1054, 1054' with the latch 132'.

Figure 10:
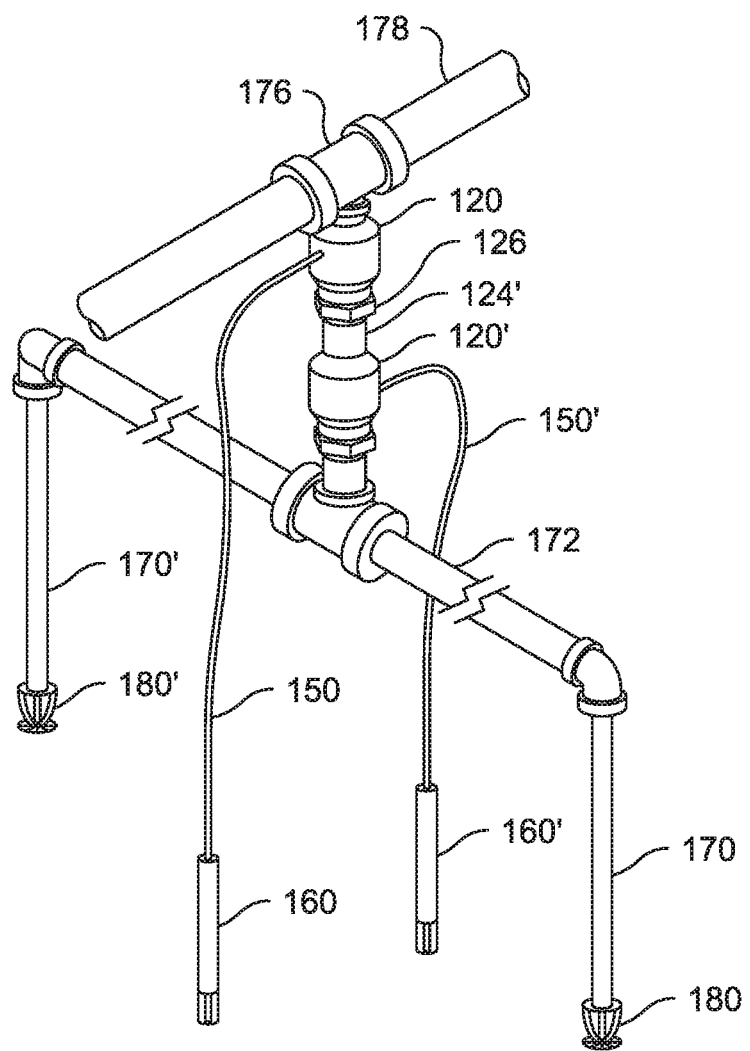
FIG. 10 depicts back to back valve components of two preaction valve assemblies for added protection against inadvertent activations in accordance with a preferred embodiment of the invention.

FIG. 10 depicts part of an installation of a fire protection sprinkler system in a location such as a computer center or laboratory, where the contents at the location would be severely damaged or compromised by the release of water, but fire protection is still required. Two valve components according to the invention, e.g. 120, 120', are installed back to back such that the outlet end 126 of the first valve component 120 is connected to the inlet end 124' of the second component 120'. The inlet end 124 of the first valve component 120 is in fluid communication with the sprinkler system water supply through a Tee 176 and a main or branch line 178. The outlet end 126' of the second valve component 120' is connected piping, namely, a Tee 174 of a manifold 172 in fluid communication with the drop tube(s) 170, 170' extending to one or more water sprinkler(s) 180, 180' which are thereby operably and fluidly connected with the paired valve components 120, 120'. Each valve component 120, 120' has and is operably connected with its own activation component 160, 160' (the same as or similar to activation component 60). The activation components 160, 160' are to be installed at locations sufficiently apart from one another that the accidental triggering of one is not likely to involve the accidental triggering of the other. Both activation components 160, 160' would have to be triggered to open each of the two valve components 120, 120' to permit water to flow from the supply line 178 through the paired valve components 120, 120' to the drop line(s) 170 and connected sprinkler(s) 180. In this instance, if the sprinkler(s) 180 have their own thermally responsive elements, triple protection against inadvertent water release is provided: water flow through a particular sprinkler 180 requires activation of each of the two valve components 120, 120' by the two activation components 160, 160', as well as activation of the sprinkler 180 and/or 180'. Double protection that is commonly provided by other third-party components and arrangements would be provided with the two valve components 120, 120' being fluidly connected with open sprinklers—that is, lacking plugs and thermally responsive elements). If used with a sprinkler having its own thermally responsive element, a standard system with a single valve component 20, as depicted in FIG. 7, provides two layers of protection against unnecessary triggering—one level from the valve component 20 and one level from using a sprinkler 80 with its own plug 89 and thermally responsive element 88. The piping such as 70, 72 (FIG. 8) and 170, 172 (FIG. 10) is illustrative only. It should be appreciated that the installer can assemble the piping in any way necessary or desired so as to wrap around or extend through any obstructions that may lie between the valve and the desired location of the sprinkler or water distribution device connected with the valve.

Figure 11:
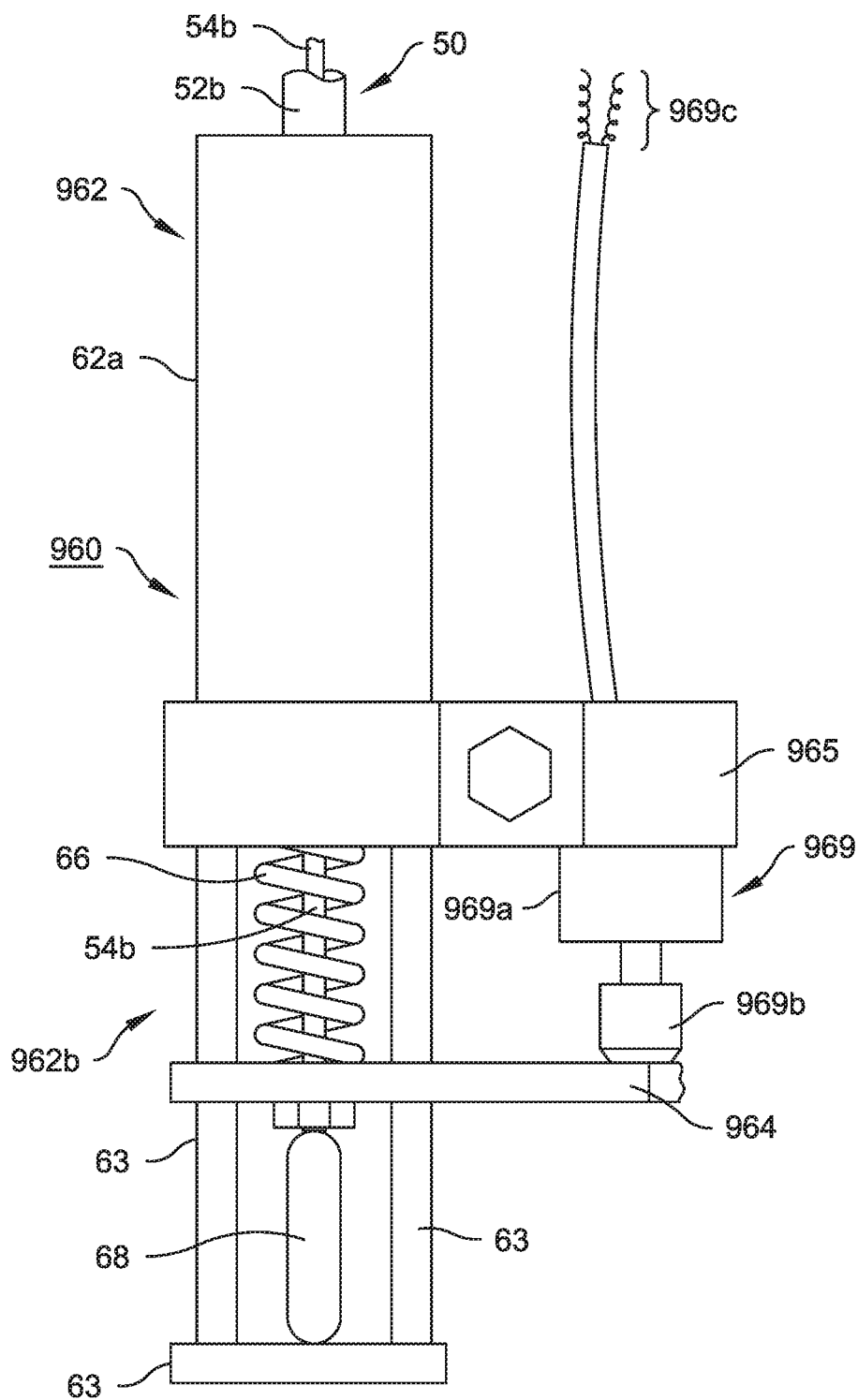
FIG. 11 depicts an activation component with a micro switch in accordance with a preferred embodiment of the invention.

FIG. 11 depicts a slightly modified activation component 960 that is again connected through a flexible connector 50 to a valve component such as 20 or 120. The flexible connector 50 preferably has a flexible outer cable housing 52 slidably supporting a flexible cable 54. An activation component 960 includes a base 962 that includes an upper, spacer portion 62a identical to that of component 60, from which extends a sensing portion 962b. The second end of the outer cable housing 52b is again received in the transverse distal/upper end 961 of a spacer portion 962a. The second end 54b of the flexible cable 54 is connected with a movable member 964 slidably mounted with respect to the sensing portion 962b of the housing 62 on a pair of rods 63. A bias member 66, which as depicted is a compressed coil spring, biases the movable member 964 holding the second end 54b of the cable 54 away from the spacer portion 962a. In preactivation position of the device, the movable member 964 is restrained by the thermally sensitive member 68.

To that combination is added a micro switch 969 that changes state with operation of the activation component 960. The switch 969 has a main body 969a, a movable actuation button 969b and leads 969c. The body 969a of switch 969 is supported from the spacer portion 62a by means of a bracket 965. Triggering of the activation component 960 by breakage of the thermally responsive element 68 allows the spring 66 to force the movable member 964 towards the lower end plate 61 releasing the button 969b to allow the switch 969 to change states. Two leads 969c are provided for electrical connection to the switch 969 for control of electrical equipment such as alarms or electronic controllers (not depicted). Thus the activation component 960 for use in a thermal trigger assembly includes a switch 969 mounted on the activation component so as to change states with movement of the movable member 964.

The switch 969 and bracket 965 may be supplied as an accessory to a basic activation component 960 that differs from original activation component 60 by the modified movable member 964. Still other arrangements will occur to those of ordinary skill in the art. It will be appreciated that the switch 969 should be mounted as depicted or in some other way so as to be removable to test its operation without triggering the activation component 960.

Figure 12:
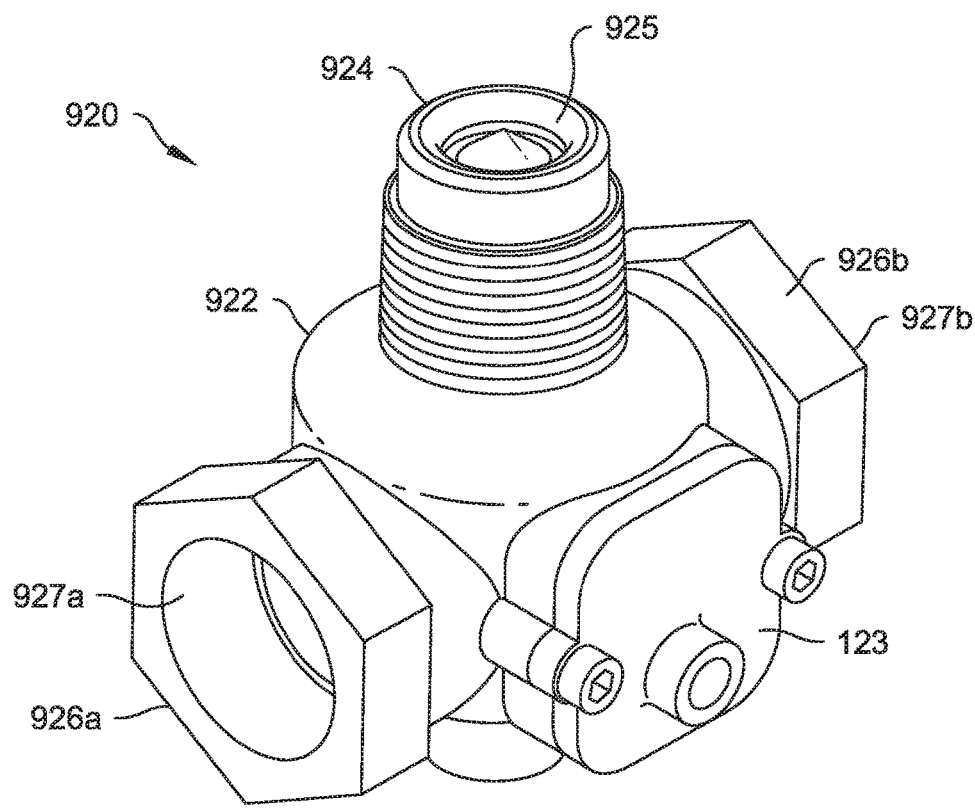
FIGS. 12 and 13 are perspective and elevational cross-section views of a valve component with two outlets in accordance with a preferred embodiment of the invention.
Figure 13:
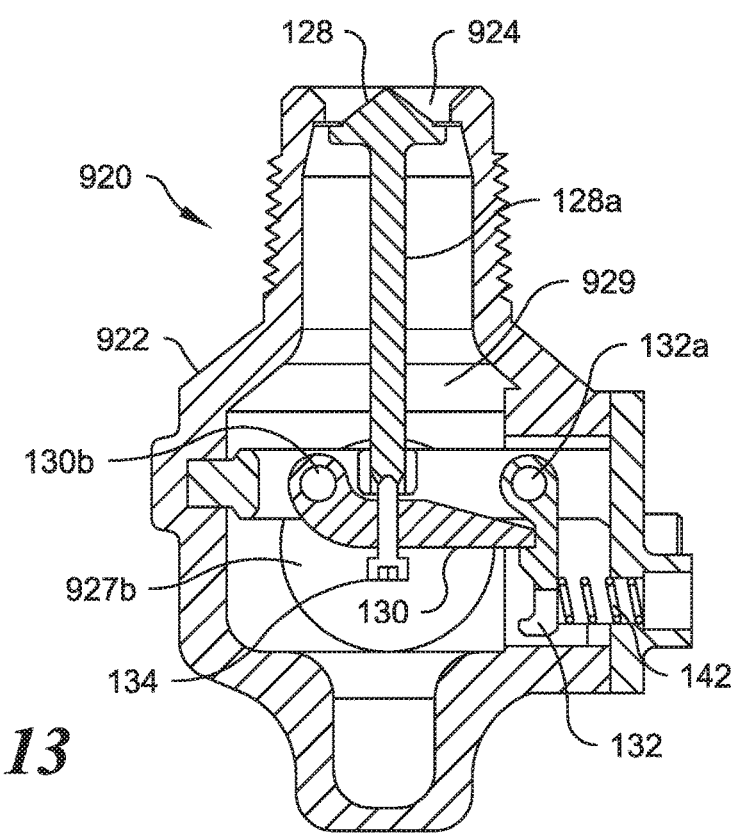

FIGS. 12 and 13 depict yet another embodiment of a valve component 920. The valve component 920 again includes a body 922 with an inlet end 924 and an inlet 925 externally threaded to be received in a Tee in a wet supply line (neither depicted) and, in this embodiment, first and second outlet ends 926a and 926b having first and second outlets 927a and 927b, respectively. The outlets 927a, 927b are fluidly connected with the inlet 925 by the passageway 929. Each outlet end 926a, 926b is not threaded in this embodiment to enable the valve component 920 to be used with plastic pipe drop tubes fabricated by the installer. However, each outlet end 926a, 926b could be internally threaded to receive an externally threaded length of metal drop tube, again fabricated on site by the installer.

In the valve component 920, a cover 123 (as show in FIGS. 4-6) again closes the opening through the sidewall of the body 922. The internal components of the valve member 920 are the same as those of valve member 120, with the same seal member 128 supported by the same subassembly 148 (see FIG. 6), including a lever 130, and a latch 132 supported in the same way on the inside of the cover 123 with a bias member/compressed coil spring 142 mounted so as to bias the latch 132 into releasable engagement with the lever 130. The latch 132 pivots around a latch pivot 132a, which is a pinned connection. Similarly, the lever 130 pivots around a latch pivot 130b, which is also a pinned connection.

The latch 132 of the valve component 920 is again connected with an activation assembly (not depicted) like previously identified 60, 160 or 960 via a flexible connector (not depicted) like previously identified 150. The principal difference between this valve component 920 and the valve component 120 is the provision of two opposing outlets 927a, 927b oriented essentially perpendicularly to the inlet 925 and seal member 128 instead of having a single outlet in line with the inlet 125 and the seal member 128. The lever 130 includes the adjustment screw 134 located to contact a distal end of the shaft and 128a to vary mechanical compression applied to the seal member 128 by the lever 130 in the closed position.

Figure 14:
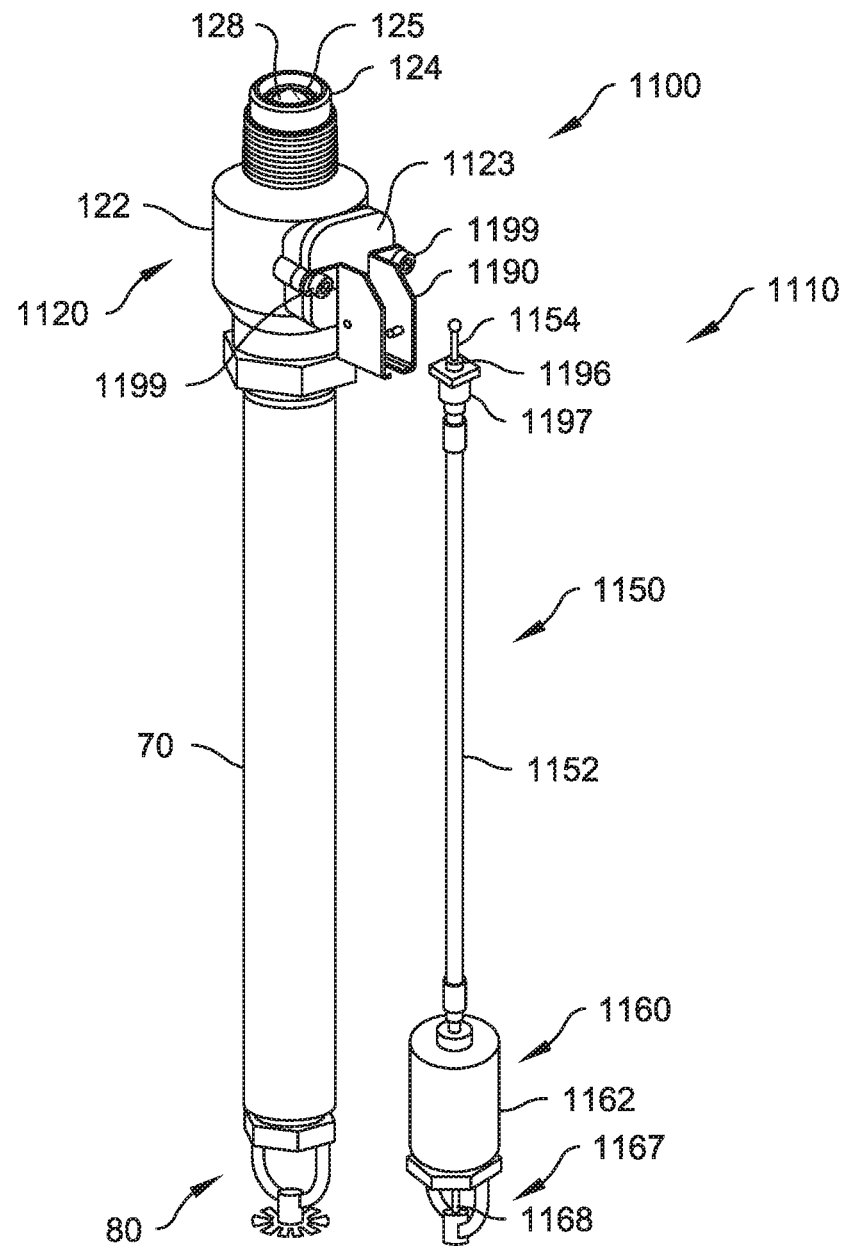
FIG. 14 is a perspective view of a dry sprinkler device made with a preaction valve assembly in accordance with a preferred embodiment of the invention.

FIG. 14 depicts a dry sprinkler device embodiment 1100 of the present invention using a thermal trigger assembly 1110 with slightly modified embodiments of a valve component 1120, a flexible connector 1150, and an activation component 1160. The valve component 1120 and proximal end of the flexible connector 1150 are shown in cross section in FIGS. 15-16. The valve component 1120 includes the same body 122 with an inlet end 124 having an inlet 125, which is externally threaded so as to be received in a tee fitting or in another type of fitting connection from a water supply line. An outlet end 126 has an outlet 127, which is internally threaded to receive an externally threaded length of pipe 70 (fabricated by an installer), which receives a conventional, open sprinkler 80. A seal member 128 is again supported in the inlet 125 by a lever 130 retained in a "closed" or "supporting" position by a latch 132. The latch 132 pivots around a latch pivot 132a, which is a pinned connection. Similarly, the lever 130 pivots around a latch pivot 130b, which is also a pinned connection. An internal subassembly 148 slidably supports a shaft portion 128a of the seal assembly 128 and pivotally supports the lever 130 and latch 132. The subassembly 148 is again secured to a cover 1123, which is again removable from the remainder of the body 122. In addition to the subassembly 148, in this embodiment, a crank assembly 1190 is secured to the body 122 with the cover 1123 using the same removable fasteners 1199 used to secure the cover 1123 to the body 122. The crank assembly 1190 includes a bracket 1191 physically secured to the cover 1123 that pivotally supports a crank 1192. The assembly 1190 including the crank 1192 mechanically couples the first end 1154a of the flexible cable 1154 to the latch 132. One forked arm 1193 of the crank 1192 receives one end 1174b of a link 1174, which extends through an opening 1172 in the cover 1123. An opposing end 1174a of the link 1174 is secured with the latch 132. A bias member 142 in the form of a compressed coil spring is located between the cover 1123 and the latch 132 to maintain the latch 132 engaged with the lever 130. The lever 130 again includes an adjustment screw 134 located to contact a distal end of the shaft and 128a to vary mechanical compression applied to the seal member 128 by the lever 130 in the closed position.

Figure 15:
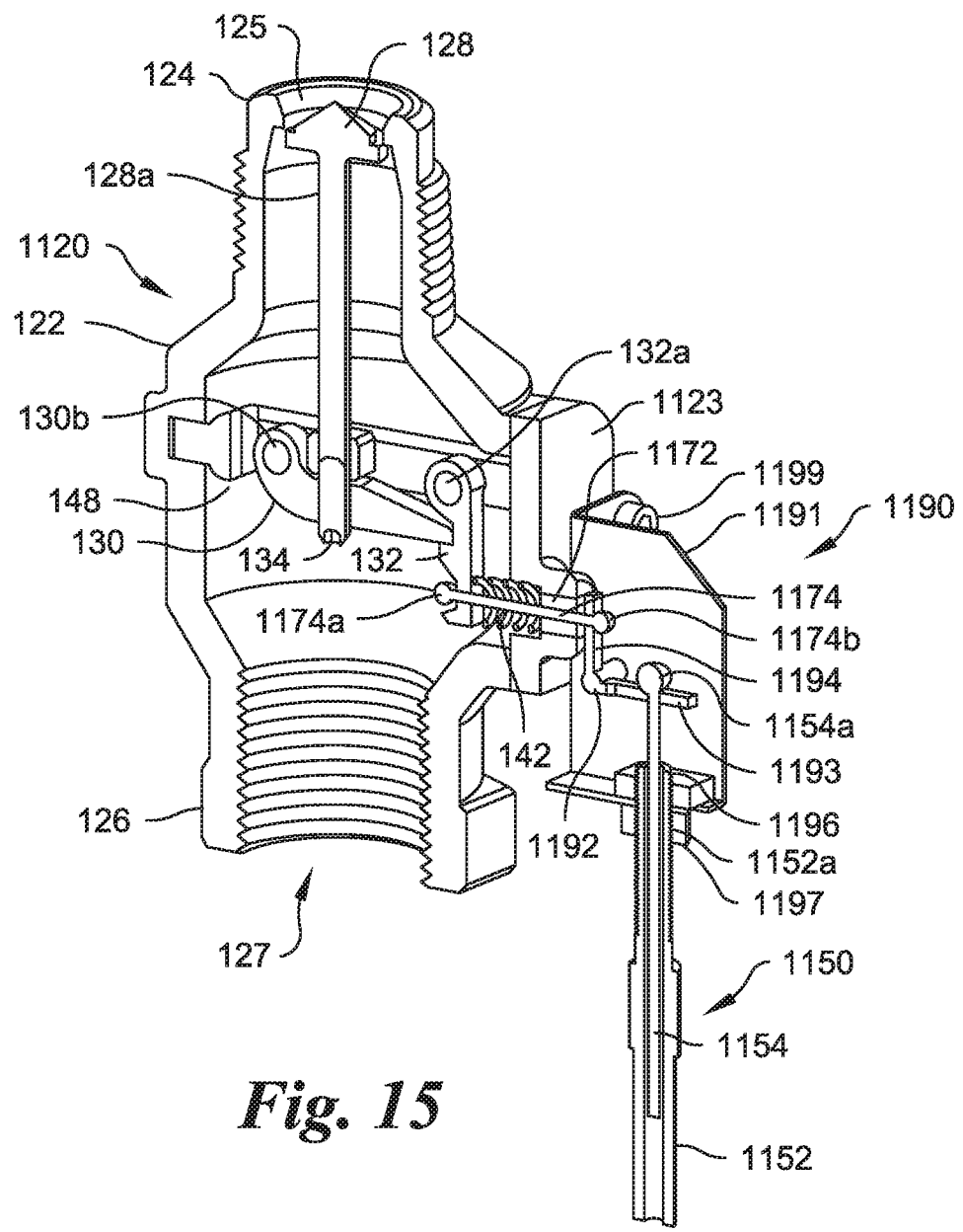
FIGS. 15 and 16 are sectioned views of the valve component and flexible connector of FIG. 14 showing activation of the valve from a closed to open configuration/state, respectively.
Figure 16:
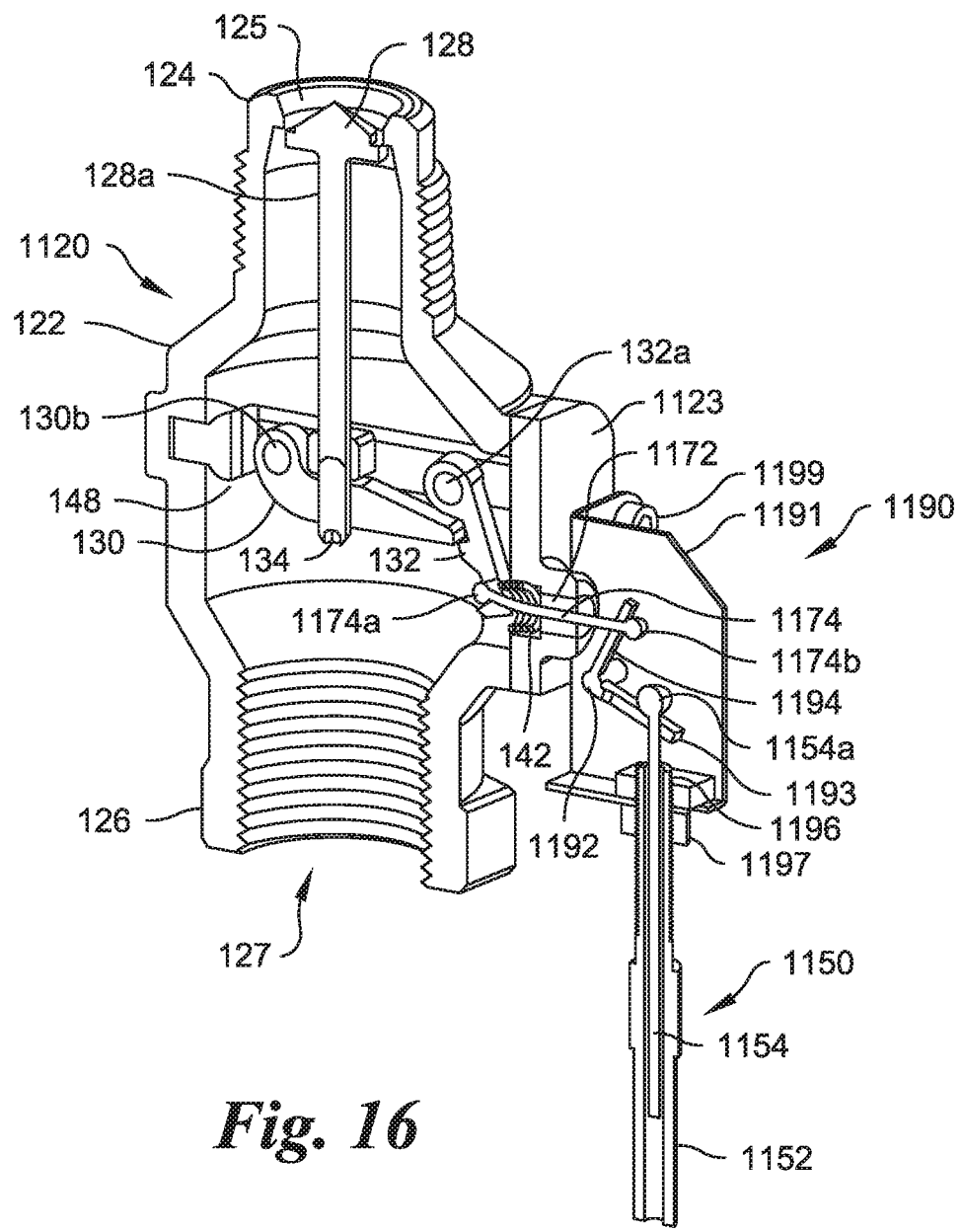

The latch 132 is operatively mechanically connected with the activation component 1160 through the flexible connector 1150, the crank assembly 1190, the crank 1192, and the link 1174. The crank 1192 has another forked arm 1194 offset approximately 90° from the arm 1193. Again, the flexible connector 1150 is an assembly having a flexible outer cable housing 1152 slidably supporting a flexible inner cable 1154. A first end 1152a of the outer cable housing 1152 is preferably fixedly connected with the valve body 122 through the bracket 1191 by threaded members 1196, 1197 on the first end 1152a of the cable housing 1152. A first end 1154a of the flexible cable 1154 is received in the arm 1194 to operably mechanically connect with the latch 132 through the crank 1192 and the link 1174. Opening of the valve component 1120 from a closed configuration or state is illustrated in FIGS. 15 and 16.

The thermal activation component 1160 has the features of component 160 except the movable member and the bias member are now contained in a body/housing 1162. A conventional sprinkler 1167 without a deflector but with a thermally responsive element 1168 is threaded into the end of body/housing 1162 and its plug (not depicted) is used to restrain the movable member until the thermally responsive element 1168 fractures.

Figure 17:
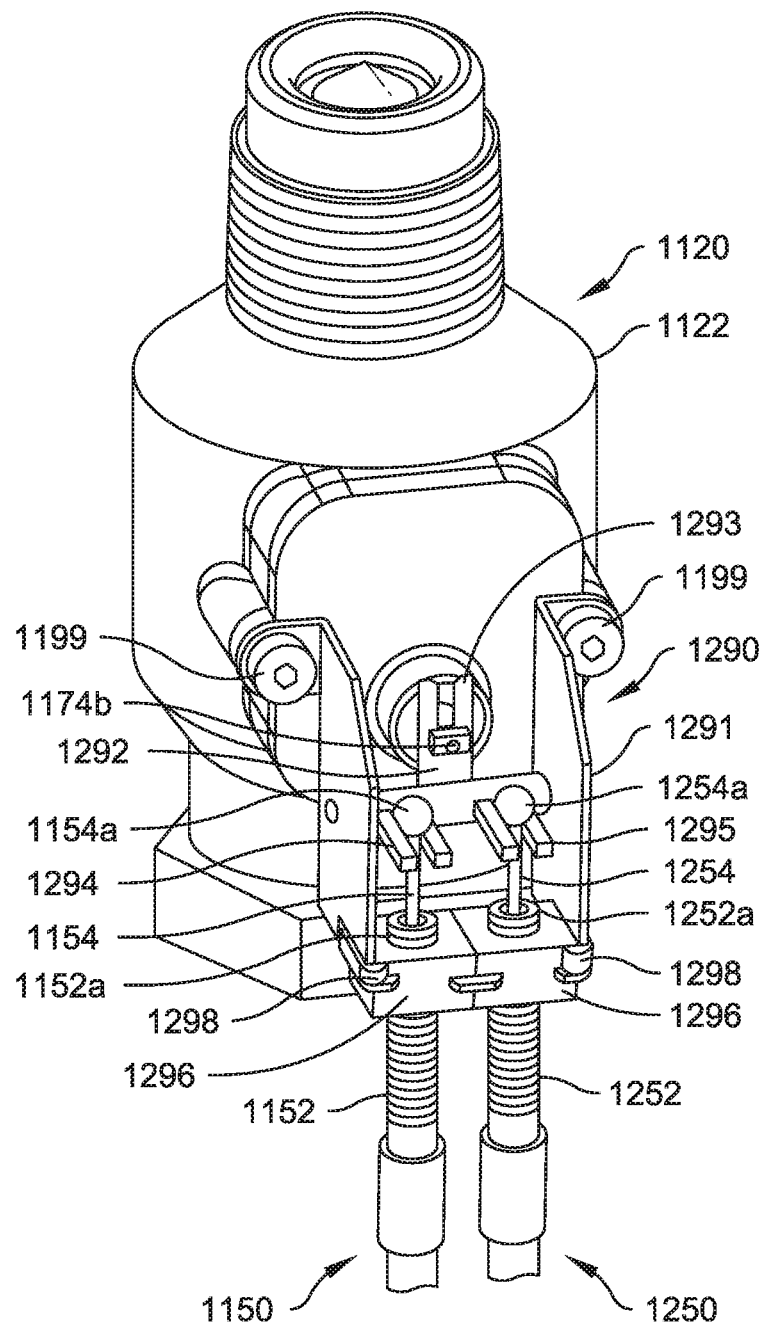
FIG. 17 is a perspective view of a valve component configured to connect with multiple activation components for activation of the valve by any of the latter in accordance with a preferred embodiment of the invention.

FIG. 17 depicts another embodiment of a mechanism 1290 for connecting two flexible connectors 1150, 1250 to a valve component 1120. In this embodiment, a bracket assembly 1290 has a frame 1291 supporting a crank 1292, which has three arms 1293, 1294 and 1295. The crank 1292 is connected to a link 1174 by arm 1293. The arms 1294 and 1295 are parallel to one another and again offset 90° from first arm 1293. The third arm connects with an end 1250a of a second flexible connector 1250 connected to a second thermal activation unit (not depicted but like 1160 or 160). In this embodiment, each flexible connector 1150 and 1250 is connected with the bracket 1291 with a single threaded member 1296, which can be adjusted along the first end 1152a, 1252a of the outer cable housing 1152, 1252 of either flexible member 1150, 1250. Each member 1296 has slots on its opposing lateral side which slide into and engage portions of the frame 1291 forming mating slots. A spring arm 1298 retains each member 1296 in its slot. Again, the first end 1154a, 1254a of each flexible cable 1154, 1254 of each flexible connector 1150, 1250 is engaged with a respective arm 1294, 1295 of the crank 1292 so as to be in mechanical operative connection with the latch 132 through the crank 1292. Movement by either cable 1154, 1254 pulls downward on the connected arm 1294, 1295 of the crank 1292, which pulls the link 1174 away from the body 1122 of the valve component 1120, thus triggering the valve component is the manner described immediately above.

FIGS. 18A and 18B depict another embodiment of a valve component 520 connected with a sprinkler 580. The valve component 520 again includes a body 522 with an inlet end 124 having an inlet 125 externally threaded to be received in a Tee 76 in a wet supply line, and outlet end 126 having an outlet 127 and internally threaded to receive an externally threaded length of drop tube 70, again fabricated on site by the installer. A modified cover 523 closes the opening through the sidewall of the body 522. The internal components of the valve member 520 are the same as valve member 120 with the exception of a modified latch member 532 and a bias member 542 mounted to the inside of the modified cover 523 so as to bias the a latch 532 into releasable engagement with the lever 130. The latch 532 is connected with an activation component 560 depicted in FIG. 18B via a flexible connector which, in this embodiment, is a single flexible wire 554. The first end 554a of the flexible wire 554 is connected with the lever 532 at opening 532b. The remainder of the wire 554 is extended through the drop tube 70 to activation component 560.

Referring to FIG. 18B, the activation component 560 is provided in a special fitting 590 for installation of a water distribution device 580, which might be a conventional pendent sprinkler (sprinkler without a thermally responsive element and plug) as depicted, or a nozzle or other water distribution device. The fitting 590 has a fluid inlet 592 internally threaded to receive the discharge end of the drop tube 70 fabricated and installed in the field. The fitting 590 has an internally threaded fluid outlet port 594 receiving a standard water distribution device 580 in the same way as a normal fitting connecting an externally threaded sprinkler inlet with an externally threaded discharge end of the drop tube 70. A separate chamber 596 of the fitting 590 forms a body housing the parts of activation component 560. The remaining end 554b of the flexible wire connector 554 extends into the inlet 592 and through a small opening or wire guide hole 595 into the separate chamber 596, the guide hole 595 being located along the edge of the flow path between the inlet 592 and outlet 594. A bias member 566 biases a wire securement member 562 outward with respect to the chamber 596. The wire securement member 562 is restrained in the chamber 596 by a less common but conventional thermally responsive element 568. A pair of arms 567 restrain the securement member 562 to hold the bias member 566 in compression and are themselves held apart by the thermally responsive element 568, which is formed by a pair of overlapped plate pieces 569*a*, 569*b* held together by a solder connection therebetween. When the element 568 is heated sufficiently to soften the solder connection, the compressed spring 566 forces the arms 567 out of the chamber 596, causing the plate pieces 569*a*, 569*b* to separate and release the wire securement member 562. The wire securement member 562 has a body 563 with a conical "inlet" end 563*a* and a central bore 564*a*, through which the installer passes a second end 554*b* of the flexible connector wire 554. A plurality of teeth 564*b* are positioned within or around or otherwise define the bore 564*a* and are oriented so as to grip the second end 554*b* of wire 554 as it is passed from the inlet end 592 through the opening 595 and through the bore 564*a* to prevent its retraction back toward the inlet end 592 of the fitting 590. Alternatively, a plug member bearing the teeth 564*b* and a spring might be provided in a sprinkler head installed in a single outlet port of the fitting, whereby the flexible connector extends between the valve component and the sprinkler head/activation component entirely within the drop tube.

Although a rigid drop 70 is depicted, it will be appreciated that a flexible tube might be used between the valve 520 and the fitting 590 as this embodiment allows for a final adjustment of the length of the wire 554 after the valve 520 and fitting 590 are secured in their final location.

In use, the fire protection sprinkler system installer prepares the drop tube 70 and then passes a free end 554*b* of wire 554 through an inlet end 70*a* of the drop tube 70. The free end 554*b* of wire 554 is then passed from the outlet end 70*b* of the tube 70 and through the inlet 592 of the fitting 590, through the small opening 595 into the chamber 596 and through the bore 564*a* of the wire securement element 562. The inlet end 70*a* of the drop tube 70 is secured with the outlet 127 of the valve body 522, preferably before the wire end 554*b* is secured in the fitting 590 but valve component and drop tube 70 may be secured together afterwards. The fitting 590 is attached to the outlet end 70*b* of the drop tube 70 so that the fitting 590, the drop tube 70 and the valve component 520 are fixedly connected together. The free end 554*b* of the wire 554 is pulled through the bore 564*a* until the wire is taut. The excess portion of the free end 554*b* of the wire is then cut off by the installer to complete the preaction assembly. At any point in this process, the water distribution component 580 is installed in the fluid outlet 594 of the fitting 590 to complete the installation.

Preferably, the flexible connectors 14, 50, 150, 1050, 1150, 1250 are Bowden cables. The outer cable housing 52, 152, 1050, 1152, 1252 is typically formed by tightly spirally wound wire which prevents kinking and protects the flexible inner cable 54, 154, 1054, 1154, 1254. Typically, an internal lubricant or coating is provided between the outer cable housing 52, etc., and the flexible inner cable 54, etc., which again prevents restriction between the outer housing 52, etc. and the flexible inner cable 54, etc. Such cables can be manufactured to operate at −65° F., well below any temperature to which the thermal trigger assemblies 10, 110 would be exposed. Although a simple two-piece cable 50, etc. with inner cable 54, etc. and spiral wound outer housing 52, etc. is preferred, it will be appreciated that the flexible connector 14, 50, etc. might be provided as a metal wire or cable in a polymer tube, such as bicycle cables are constructed. If the latter, it is suggested and preferred that the metal wire/plastic tube connector be provided in a protective coiled wire outer sleeve, again for protection.

In another aspect, a preferred embodiment of the present invention is a method of providing a dry sprinkler device. The method includes connecting an inlet of a valve to a branch water line. The method also includes mechanically connecting an activation component with a thermally responsive element to the valve with a Bowden cable so as to open the valve in response to a loss of physical integrity of the thermally responsive element. The method also includes fluidly connecting a water distribution device to an outlet of the valve to spray water received from the valve.

In another aspect, a preferred embodiment of the present invention is a method of installing a dry sprinkler device. The dry sprinkler device includes a valve, an activation component with a thermally responsive element, and a flexible Bowden cable. The Bowden cable mechanically couples the activation component with the valve so as to open the valve in response to a loss of physical integrity of the thermally responsive element. The method includes fluidly coupling an inlet of the valve with a water supply line. The method also includes installing a water distribution device at a location spaced apart from the valve. The method also includes connecting the device with an outlet of the valve through intermediate piping. The method also includes installing the activation component at a location spaced apart from the valve. The valve is operatively connected with the activation component through the Bowden cable.

The ability to displace the activation component from the sprinkler head or other device being controlled permits the advantageous location of the activation component at an optimal location for fire identification and response and placement of the connected sprinkler(s) at optimal location(s) for water distribution and/or coverage.

Another possible use of the devices of the present invention is the provision of fire protection in attics of wood construction and other combustible concealed areas without or with obstructions.

Many embodiments of the invention offer a number of possible sprinkler options that were heretofore not available or unlikely to pass fire tests for attic use. The activation component of the present inventive system can be located at the peak of a roof, or wherever is optimum for the detection of heat from a fire most quickly for most rapid activation, while the sprinkler head(s) connected with the activation component through a valve component can be located wherever provides the best protection or installation—at the peak, away from the peak and/or away from the pitch—to obtain optimum water distribution and/or to be located closer to any potential source of fire.

Embodiments of the present invention enable the installation of any and all types of conventional sprinkler heads (pendent and sidewall, as well as upright and standard spray) in these locations, albeit in an open configuration without a plug or thermally responsive element. The provision of the present invention will further enable the development of other new concept spray distribution methods and sprinkler heads suitable for such application(s). Moreover, it is expected that conventional automatic sprinkler heads will be installable according to their maximum listed coverage areas (or at least greater than one-hundred and thirty square feet if their normal, listed coverage area exceeds one-hundred and thirty square feet) and without hydraulic demand penalties currently imposed on conventional automatic sprinklers used in attics and other combustible concealed installations. The open sprinkler heads connected to a valve component of the present invention will also be able to be pitched from the vertical to enhance their throw patterns, if necessary or desirable. It also provides the opportunity to use even less water than now required since embodiments of the invention provide optimum placement of the activation component for activation, as well as optimum placement of the spray sprinklers for fire protection because the functions are separated rather than being provided by a single device in the manner of a standard sprinkler.

These advantages will be available in sprinkler systems installed in yet other "problem areas." So, the provision of the present invention enables the installation of a dry attic sprinkler system while employing conventional automatic sprinkler heads that are open. The valve component can be located in a heated or other non-water sensitive area spaced away from a cold/water sensitive area where the activation component and heads can be located. Alternatively, water can be provided to a preaction valve assembly of the invention located in a cold/water sensitive area by the provision of a dry valve located upstream in a heated/non-water sensitive area where the distance between the heated/non-water sensitive area and the activation component is greater than the length of the flexible connector of the preaction valve assembly.

Finally, the provision of sprinkler heads fed by a valve component of the present invention will permit the optimum location of the heads to attack a fire with a discharge of water sufficiently quickly and sufficiently close to the fire source to enable the passage of laboratory fire tests with delivered water densities of less than 0.1 GPM/sq.ft of coverage area that is currently the required minimum.

Another application would be the fire protection of a truck loading dock that is under freezing conditions. The thermal trigger assembly of the present invention would replace a very expensive and complicated dry sprinkler system by allowing the use of existing approved open conventional sprinklers installed in the freezing area and installing the valve component in a heated area. This concept could possibly allow the reduction of ordinary hazard water densities to be lowered to light hazard requirements (over 50% less water) because of the speed and strategic positioning allowed by the invention.

The thermal trigger assemblies and the dry sprinkler device variations of the present invention offer numerous advantages over conventional dry sprinklers.

All known dry sprinklers have to be sized for a particular installation to within a fraction of an inch in length. All known dry sprinklers are not designed for length adjustment of any kind in the field or, at most, are designed for only the most minimal length adjustment in the field]. Consequently, all have to be made to some measured length at a factory and not in the field by the installer. In addition to the time mentioned earlier to custom fabricate each sprinkler at the factory and the potential problem of measurement or fabrication length errors, the custom sprinklers have to be shipped to the installer and may be damaged in transit.

The maximum length/height of commercially available dry sprinkler heads is four feet, which establishes the maximum distance from a wet, water supply line. Thermal trigger assemblies of the present invention can be supplied with flexible connectors having a single given maximum length greater than or equal to four feet or in different lengths, for example in integer or two or three foot increments. Any of these options would represent significant savings and installation versatility compared to custom length, conventional dry sprinklers.

Conventional automatic sprinkler heads—that it, sprinkler heads that are testing laboratory approved and listed for NFPA 13—can be installed with the subject thermal trigger assemblies and preaction valves of the invention, in the field, at the same time the rest of the fire sprinkler system is being installed. The installer simply cuts or assembles a length of pipe (i.e. the drop) on the job as he would with a conventional wet sprinkler system and attaches a conventional open or automatic sprinkler head to the drop. The installer can finish the system installation with no delay or special procedures. Fire protection is immediately available while the rest of the trades finish construction, whereas with conventional dry sprinkler systems there would be no protection until after the specially ordered, conventional dry sprinklers were installed, days and even weeks] after the supply piping is installed.

Being able to install any conventional automatic sprinkler head into a dry sprinkler device is itself a significant advantage. In addition to specific lengths, installers of conventional dry sprinkler systems have to specify other characteristics to order conventional dry sprinklers, including orientation (sidewall, upright or pendent and, if pendent, exposed, recessed or hidden), operating temperature, orifice size, finish and/or color. There are literally many hundreds if not thousands of different conventional automatic sprinkler heads available from a variety of manufacturers that can be used, off the shelf, with valve components of the present invention to satisfy the thousands of potential combinations of these characteristics. Since only the valve components of the dry sprinkler devices of the present invention need approval from the recognized testing laboratories, it will be possible to install virtually any conventional automatic sprinkler head (open or plugged) with a valve component of the present invention, without limitation, to provide a dry system.

While there are literally many hundreds if not thousands of possible different characteristic combinations for fire sprinklers, and many manufacturers willing to commercially supply those combinations in automatic sprinkler heads, they will only supply no more than about one-tenth of those characteristic combinations in dry sprinklers because each dry sprinkler must be tested independently by the approving labs as to operation, corrosion, and other performance characteristics. With each dry sprinkler costing more than $10,000 to be tested for approval by one of the recognized testing laboratories, manufacturers limit the varieties of dry sprinklers available because the market is not so big as to justify those approval expenses for the full range of available wet system sprinkler heads. Once approved, the preaction valve with thermal trigger assemblies of the present invention will instantly allow virtually every laboratory approved conventional automatic sprinkler head of every manufacture to be installed as a dry sprinkler device. This gives sprinkler system designers, building owners, and installers a virtually unlimited choice of sprinkler heads to use that will also save installation costs.

Since the valve components of the present invention can be mechanically tripped, they can be further be configured or accessorized to be separately remotely tripped, automatically or on demand.

Thermal trigger assemblies of the present invention can be configured to automatically trip at a temperature below, above, or equal to the rated temperature of the connected automatic (i.e. plugged) sprinkler head(s) by selection of the operating temperature of the thermally responsive element 68 of the activation component 60 to be lower or higher compared to that 88 of the plugged sprinkler head 80. Thus, it is possible to preload a sprinkler head with water prior to activation, if desired, or delay loading of the sprinkler head until after it has opened.

When used to provide a two-step activation, thermal trigger assemblies of the present invention also give superior protection against vandalism or accidental damage, false trips or faulty sprinklers, and water damage—a major concern of both insurance companies and building owners. If a sprinkler is damaged prior to normal activation—for example, a bulb or other thermally responsive element breaks or is accidentally broken, or is defective (i.e. permits leak)—no water will be released since the "independent" activation component 60 of the present invention would not be triggered by damage to the sprinkler. Not only does this prevent water damage from unintended activation, it allows immediate field repair without removing the system from protective service and without having to wait for a factory manufactured replacement assembly. The system can be fully repaired, in the field, like a conventional wet system. (Maintaining an active system during head repairs has been notoriously very expensive, with sophisticated equipment required.)

If the thermal trigger assembly of a system with automatic (i.e. plugged) sprinkler heads is configured to open the valve component before sprinkler activation, fire protection will be improved because there is no air to escape before the water flows from the sprinkler heads. The valve component will prefill the sprinkler heads before conditions reach the activation temperature of the sprinkler heads.

A preaction valve with thermal trigger assembly of the present invention will potentially allow plastic piping to be used as drops in areas that would have normally required dry sprinklers, provided that the valve component can be located in an area protected from and/or otherwise not subjected to freezing temperatures. This represents a tremendous savings in installation time and costs, particularly in those residential and light hazard systems otherwise amenable to plastic pipe installation throughout. The assemblies can be configured by selection of the thermally responsive elements 68 to operate at a temperature above that at which the thermally responsive elements 88 used in any automatic (i.e. plugged) sprinklers 80 activate to assure there will be no water inside the drop or pressurization of the drop until the thermally responsive elements 68, 88 of both the activation component 60 and the sprinkler 80 have reached their respective activation temperatures.

If the activation component 60 trips from breakage of the responsive element 68 or its equivalent, but the automatic (i.e. plugged) sprinkler 80 does not activate, the exposed portion of the activation component 60 will provide a visual indication below the ceiling that the activation component 60 has tripped and that water is in a potentially freezing area. If the sprinkler 80 leaks, dripping of water will provide a secondary indication of caution that the drop pipe 70 is full of water and should be serviced.

In addition to providing a very economical alternative to compressed gas and antifreeze "dry" sprinklers, thermal trigger assemblies of the present invention can further present the possibility of economical dry residential sprinkler systems, with two-stage operation providing added security from damage for the property owner.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. A combination for a fire protection system connected to a piping of a building, the combination comprising:
   a valve having
      a body, an open state, and a closed state;
      an annular seal; and
      a support assembly configured to maintain the valve in the closed state, the support assembly comprising a lever supporting the annular seal;
   an activation component including
      a base,
      a movable member movable with respect to the base,
      a bias member providing a biasing force to the movable member to bias the movable member from a preactivation position to an activated position, and
      a thermally responsive element providing a retaining force to retain the movable member in the preactivation position only until a first predetermined thermodynamic condition is reached, the thermally responsive element being configured to lose structural integrity under the first predetermined thermodynamic condition, permitting the movable member to move from the preactivation position to the activated position;
   a flexible connector including
      a flexible hollow outer cable housing with a first end configured to be stationarily connected with respect to the valve and a second end, configured to be stationarily connected with respect to the base, and
      a flexible inner member slidably located inside the flexible hollow outer cable housing for only sliding movement within the outer cable housing and having a first end and a second end, the first end being configured for mechanical connection with the support assembly, and the second end being configured to be stationarily connected with the movable member so as to be moved with respect to the flexible hollow outer cable housing by movement of the movable member with loss of structural integrity by the thermally responsive element at the first predetermined thermodynamic condition;
wherein the first end of the flexible inner member is operatively connected to the support assembly such that motion of the flexible inner member in response to movement of the movable member acts on the support assembly to move the lever such that the valve changes from the closed state to the open state.

2. The combination of claim 1, further comprising:
   a second activation component including
      a second base,
      a second movable member movable with respect to the second base,
      a second bias member providing a second biasing force to the second movable member to bias the second movable member from a preactivation position to an activated position of the second movable member, and
      a second thermally responsive element providing a retaining force to retain the second movable member in the preactivation position only until a second predetermined thermodynamic condition is reached, the second predetermined thermodynamic condition being the same as or different from the first predetermined thermodynamic condition, the second thermally responsive element being configured to lose structural integrity under the second predetermined thermodynamic condition, permitting the second movable member to move from the preactivation position to the activated position of the second movable member;

a second flexible connector including a second flexible hollow outer cable housing with a first end configured to be stationarily connected with respect to the valve and a second end, configured to be stationarily connected with respect to the second base, and a second flexible inner member slidably located inside the second flexible hollow outer cable housing for only sliding movement within the second outer cable housing and having a first end and a second end, the first end being configured for mechanical connection with the support assembly, and the second end being configured to be stationarily connected with the second movable member so as to be moved with respect to the second flexible hollow outer cable housing by movement of the second movable member with loss of structural integrity by the second thermally responsive element at the second predetermined thermodynamic condition;

wherein the first end of the second flexible inner member is operatively connected to the support assembly such that motion of the second flexible inner member in response to movement of the second movable member acts on the support assembly to move the lever such that the valve changes from the closed state to the open state.

3. The combination of claim 2, wherein the first end of the first flexible inner member and the first end of the second flexible inner member are operatively connected to an activation manifold, the activation manifold being operatively connected to the support assembly, such that in response to motion of either the first movable member, the second movable member, or both the first movable member and the second movable member, the manifold acts on the support assembly to move the lever such that the valve changes from the closed state to the open state.

4. The combination of claim 3 wherein the activation manifold comprises a first spacer block and a second spacer block engaged with the first spacer block;

the first end of the first flexible inner member is operatively connected to the first spacer block, and the first end of the second flexible inner member is operatively connected to the second spacer block, so that upon movement of either the first end of the first flexible inner member, or the first end of the second flexible inner member, or the first ends of both the first flexible inner member and the second flexible inner member, at least one of the first spacer block and the second spacer block disengages from at least the other of the first spacer block and the second spacer block, so that the activation manifold acts on the support assembly to move the lever such that the valve changes from the closed state to the open state.

5. The combination of claim 4 wherein the activation manifold comprises a plunger operatively connected to the first spacer block and the second spacer block, the plunger being biased to act on the support assembly so that upon disengagement of at least one of the first spacer block or the second spacer block from the other of the first spacer block and the second spacer block, the plunger moves the lever such that the valve changes from the open state to the closed state.

6. The combination of claim 1 wherein the thermally responsive element is one of an alcohol filled glass bulb and a fusible link.

7. The combination of claim 1 wherein the activation component further comprises a switch mounted so as to change states with movement of the movable member.

8. The combination of claim 1 wherein the valve is either a poppet valve or a clapper valve.

9. A combination for a fire protection system connected to a piping of a building, the combination comprising:

a valve having a body, an open state, and a closed state; and a support assembly configured to maintain the valve in the closed state;

an activation component including a base, a securement member having a bore and gripping teeth, the securement member being movable with respect to the base, a bias member providing a biasing force to the securement member urging the securement member from a preactivation position to an activated position, a thermally responsive element providing a retaining force to retain the securement member in the preactivation position only until a predetermined thermodynamic condition is reached, the thermally responsive element being configured to lose structural integrity under the predetermined thermodynamic condition, a flexible member having a first end and an opposite second end, the first end being configured for mechanical connection with the support assembly of the valve, wherein the gripping teeth of the securement member engage the flexible member to allow the flexible member to move relative to the gripping teeth in a downstream direction with respect to the valve; and wherein the gripping teeth of the securement member engage the flexible member to resist the flexible member moving relative to the teeth in an upstream direction with respect to the valve, so that upon movement of the securement member in the downstream direction, the securement member acts on the flexible member to transmit the movement of the securement member to the flexible member, and the flexible member acts on the support assembly so that the valve changes from the closed state to the open state.

10. The combination of claim 9, wherein the valve has an annular seal, and the support assembly comprises a lever supporting the annular seal.

11. The combination of claim 10, wherein the valve has an inlet and an outlet and the combination further comprises:

a drop tube having an upstream end fluidly connected to the outlet of the valve, and a downstream end; and a water distribution device fluidly connected to the downstream and of the drop tube.

12. The combination of claim 10, wherein the valve has an inlet and an outlet and the combination further comprises:

a drop tube having an upstream end fluidly connected to the outlet of the valve, and a downstream end; and a fitting fluidly connected to the downstream end of the drop tube, the fitting having
an inlet,
a fluid outlet port fluidly connected to the inlet and forming a fluid path from the inlet of the fitting to the outlet of the fitting, and
a chamber having a flexible-member opening, the chamber containing the activation component;
a water distribution device fluidly connected fluid outlet port of the fitting.

13. The combination of claim 10, wherein the valve has an inlet and an outlet and the combination further comprises:
a drop tube having an upstream end fluidly connected to the outlet of the valve, and a downstream end; and
a fitting fluidly connected to the downstream end of the drop tube, the fitting having
an inlet, and
a fluid outlet port fluidly connected to the inlet and forming a fluid path from the inlet of the fitting to the outlet of the fitting; and
a water distribution device fluidly connected fluid outlet port of the fitting, wherein a portion of the water distribution device forms the base of the activation component.

14. The combination of claim 9, wherein the valve has an inlet and an outlet and the combination further comprises:
a drop tube having an upstream end fluidly connected to the outlet of the valve, and a downstream end; and
a water distribution device fluidly connected to the downstream and of the drop tube.

15. The combination of claim 9, wherein the valve has an inlet and an outlet and the combination further comprises:
a drop tube having an upstream end fluidly connected to the outlet of the valve, and a downstream end; and
a fitting fluidly connected to the downstream end of the drop tube, the fitting having
an inlet,
a fluid outlet port fluidly connected to the inlet and forming a fluid path from the inlet of the fitting to the outlet of the fitting, and
a chamber having a flexible-member opening, the chamber containing the activation component;
a water distribution device fluidly connected fluid outlet port of the fitting.

16. The combination of claim 9, wherein the valve has an inlet and an outlet and the combination further comprises:
a drop tube having an upstream end fluidly connected to the outlet of the valve, and a downstream end; and
a fitting fluidly connected to the downstream end of the drop tube, the fitting having
an inlet, and
a fluid outlet port fluidly connected to the inlet and forming a fluid path from the inlet of the fitting to the outlet of the fitting; and
a water distribution device fluidly connected fluid outlet port of the fitting, wherein a portion of the water distribution device forms the base of the activation component.

* * * * *